US006141522A

United States Patent [19]

Tsuruoka et al.

[11] Patent Number: 6,141,522

[45] Date of Patent: Oct. 31, 2000

[54] IMAGE FORMING APPARATUS USING AN ENDLESS BELT

[75] Inventors: Ryouichi Tsuruoka; Norio Ogawahara; Iwao Kuriki; Takeshi Fukuda; Tsuyoshi Doubata; Kouji Hamabe, all of Saitama, Japan

[73] Assignee: Fuji Xerox Co., Ltd., Tokyo, Japan

[21] Appl. No.: 09/201,873

[22] Filed: Nov. 30, 1998

[30] Foreign Application Priority Data

| | | | |
|---|---|---|---|
| Nov. 29, 1997 | [JP] | Japan | 9-343862 |
| Nov. 29, 1997 | [JP] | Japan | 9-343864 |
| Nov. 29, 1997 | [JP] | Japan | 9-343870 |

[51] Int. Cl.$^7$ ............................ G03G 15/01; F16H 55/36

[52] U.S. Cl. .......................... 399/302; 194/804; 271/198; 474/166

[58] Field of Search .................................... 399/302, 303, 399/308, 312, 313, 116, 288, 297, 159, 162, 69, 165, 298; 271/34, 4.05, 198; 222/DIG. 1; 198/804, 806; 474/166, 167, 174

[56] References Cited

U.S. PATENT DOCUMENTS

| | | | |
|---|---|---|---|
| 5,017,969 | 5/1991 | Mitomi et al. | 399/303 X |
| 5,225,877 | 7/1993 | Wong | 399/165 X |
| 5,300,984 | 4/1994 | Fuma et al. | 399/312 X |
| 5,697,030 | 12/1997 | Hayashi et al. | 399/312 X |
| 5,717,984 | 2/1998 | Wong | 399/165 |
| 5,870,649 | 2/1999 | Gotoh | 399/298 X |
| 5,918,087 | 6/1999 | Kimura et al. | 399/69 |

FOREIGN PATENT DOCUMENTS

| | | |
|---|---|---|
| 2-27383 | 1/1990 | Japan . |
| 4-257888 | 9/1992 | Japan . |
| 4-333456 | 11/1992 | Japan . |
| 5-134556 | 5/1993 | Japan . |
| 6-35331 | 2/1994 | Japan . |
| 7-266422 | 10/1995 | Japan . |
| 8-152812 | 6/1996 | Japan . |
| 9-16512 | 1/1997 | Japan . |
| 9-175686 | 7/1997 | Japan . |

*Primary Examiner*—William Royer
*Assistant Examiner*—Hoan Tran
*Attorney, Agent, or Firm*—Finnegan, Henderson, Farabow, Garrett & Dunner, L.L.P.

[57] ABSTRACT

In an image forming apparatus, such as an electrophotography-basis copying machine or laser printer, ribs are provided on and along both side ends of the inner surface of an intermediate transfer belt. Rib guides are provided on both ends of a drive roll. The ribs are brought into contact with the rib guides, whereby the intermediate transfer belt is guided. The diameter of each rib guide is slightly larger than the diameter of the drive roll, to thereby form a gap between the drive roll and the intermediate transfer belt. In a region including the gap and its vicinity, a friction created between the drive roll and the intermediate transfer belt is reduced. Therefore, thrust of each rib against each rib guide, caused by the walk, is reduced.

33 Claims, 19 Drawing Sheets

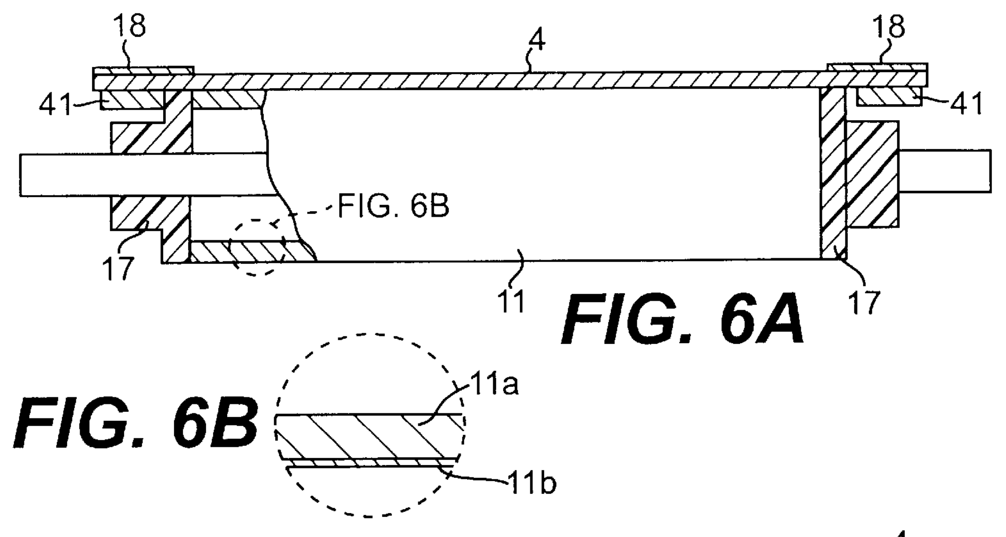
FIG. 6A
FIG. 6B
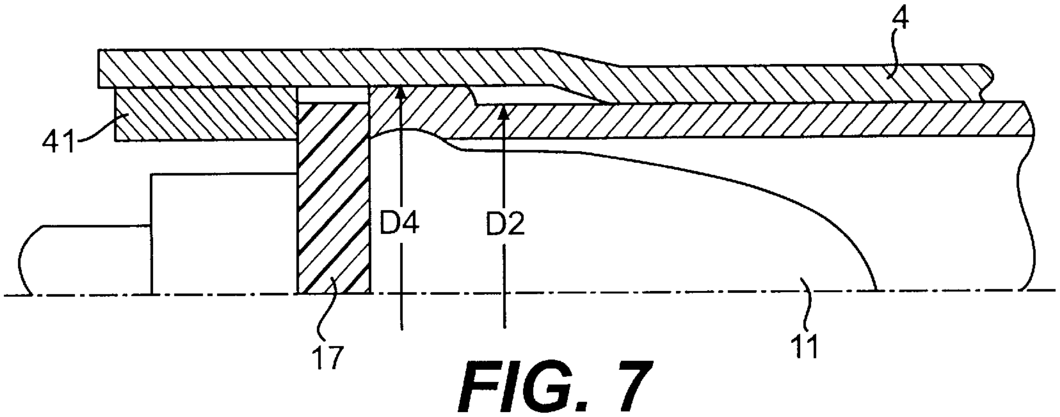
FIG. 7
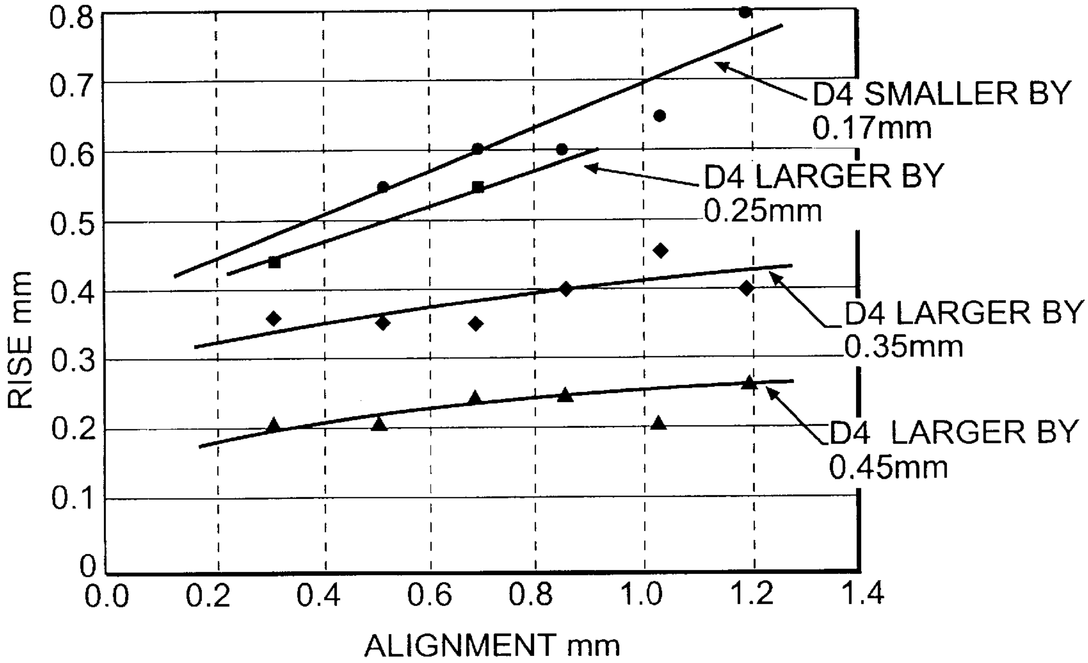
FIG. 8

| FACTOR | NUMBER OF SAMPLES 5 |
|---|---|
| ① REPETITION ACCURACY $3\sigma$ n-1 N=20 | 6. 6 ~ 11. 8μm |
| ② POWER VOLTAGE VARIATION ± 0.03% | 0. 6 ~ 1. 0μm/(0. 03V) |
| ③ SENSING DISTANCE (BELT SURFACE FLUCTUATION) | 3. 8 ~ 11. 6μm/(32μm) |
| TOTAL ERROR $\sqrt{1^2+2^2+3^2}$ | 7. 5 ~ 16. 6μm |
FIG. 36
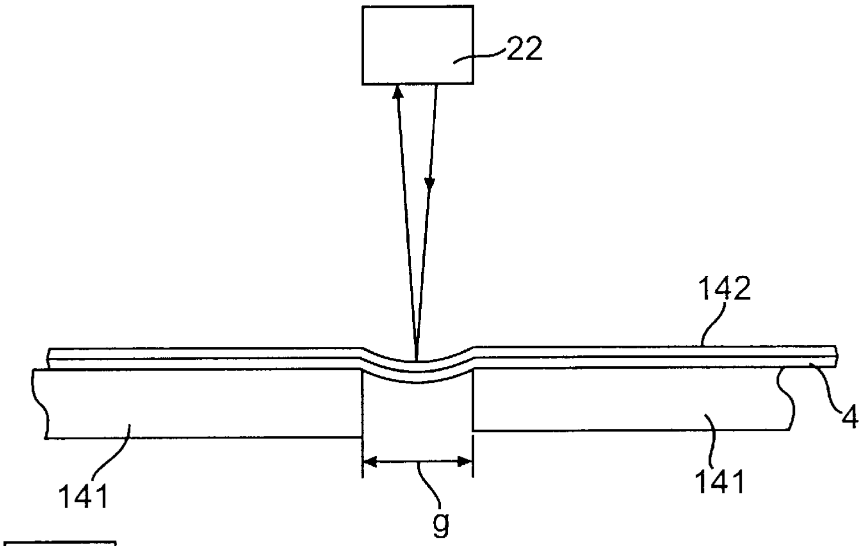
FIG. 37
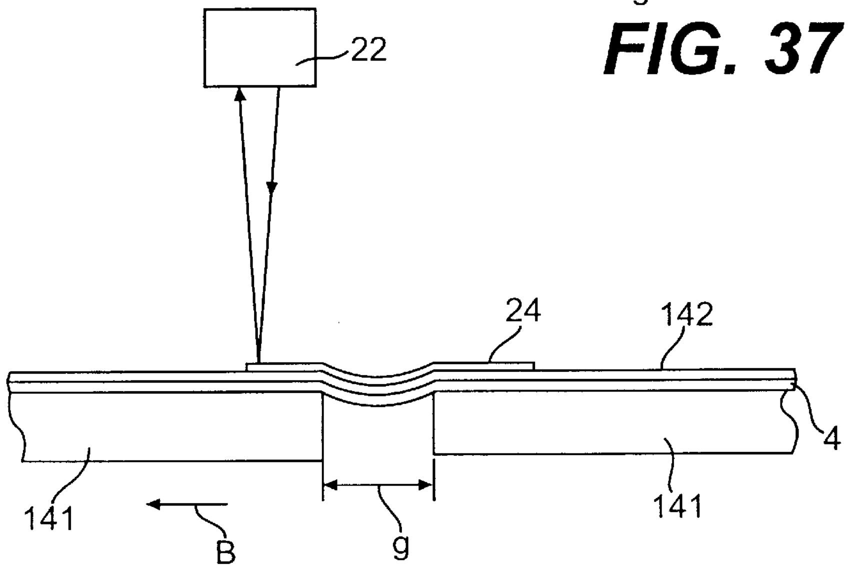
FIG. 38

(JIS Z-0237)

| ITEM | UNIT | VALUE |
|---|---|---|
| TAPE THICKNESS | mm | 0.05 |
| TENSILE STRENGTH | kgf/25mm | 9 |
| EXTENSION | % | 70 |
| BONDING FORCE | gf/25mm | 1000 |

IMAGE FORMING APPARATUS USING AN ENDLESS BELT

BACKGROUND OF THE INVENTION

1. Field of the Invention

The present invention relates to an image forming apparatus, such as an electrophotography-basis copying machine or laser printer. More particularly, the invention relates to an image forming apparatus for forming an image by use of belt-like image forming members, e.g., a belt-like photosensitive member and a belt-like intermediate transfer member.

2. Description of the Related Art

Such an image forming apparatus as an electrophotography-basis copying machine or printer employs an image forming process in which an unfixed toner image is formed on an electrostatic latent image carrier, e.g., a photosensitive drum, and transferred from the image carrier onto a recording medium, e.g., a piece of paper, whereby a picture is printed on the recording medium. To transfer the unfixed toner image to the recording medium, two methods have been used. A first method is to directly transfer the unfixed toner image onto the recording medium. A second method is to primarily transfer an unfixed toner image from the electrostatic latent image carrier onto an intermediate transfer member shaped like a drum or an endless belt film, and then to secondarily transfer the unfixed toner image from the intermediate transfer member to a recording medium, whereby an image on an original document is reproduced on the recording medium.

FIG. 13 is a diagram schematically showing a model of a color printer which is an example of the image forming apparatus using the belt-like intermediate transfer belt. As shown, the surface of an electrostatic latent image carrier (which takes the form of a photosensitive drum in the description of the specification) 1 is uniformly charged by a charger 2, and scanned with a laser beam L, so that an electrostatic latent image defined by an image signal of a first color is formed on the surface of the latent image carrier. As the photosensitive drum I is rotated in the direction A with an arrow head, the latent image moves and reaches a position facing a developing device of the first color of a developing unit 3, and it is developed into a toner image T by the developing device of the first color. The photosensitive drum 1 carrying the toner image T thereon is further rotated.

An intermediate transfer belt 4 moves at a speed substantially equal to the peripheral speed of the photosensitive drum 1 in harmony with the toner developing operation. In a primary image transfer section in which a primary image transfer roll 5 is disposed in contact with the intermediate transfer belt 4 right under a position where the photosensitive drum 1 comes in contact with the intermediate transfer belt 4, the toner image T is primarily transferred from the photosensitive drum 1 onto the intermediate transfer belt 4 under a transfer electric field which is applied to the primary image transfer roll 5, the polarity of the transfer electric field being opposite to the toner charging polarity. Here, a primary image transferring cycle is completed.

As the intermediate transfer belt 4 travels, the toner image primarily transferred onto the intermediate transfer belt 4 moves and reaches a secondary image transfer section including a secondary image transfer roll 6 disposed therein. In the full-color image forming apparatus, the process ranging from the latent image forming step to the primary image transfer step is repeated a predetermined number of times (generally, for four colors of yellow (Y), magenta (M), cyan (C) and black (Bk)), whereby toner images of a multiple of colors are superposed on the intermediate transfer belt 4 to form a full-color toner image thereon.

To form an image of a multiple of colors, the developing unit 3 is constructed with a rotary machine including four color developing devices; yellow, magenta, cyan and black developing devices 3-1 to 3-4. The developing unit 3 thus constructed sequentially develops the latent images of those colors that are formed on the photosensitive drum 1 into color toner images.

After the toner image of the first color that is carried on the photosensitive drum 1 is transferred from the drum onto the intermediate transfer belt 4 in the primary image transfer section, the following steps are executed: toner left on the surface of the photosensitive drum 1 is removed by a cleaner 7; the surface is neutralized by a discharger (not shown); and an electrostatic latent image for the second color is formed thereon. The latent image of the second color is developed into a toner image of the second color in a similar manner to that in which the latent image of the first color is developed. The toner image of the second color is transferred on the first toner image already transferred on the intermediate transfer belt 4, in a superposing fashion. The toner images of the third and subsequent colors are sequentially superposed on the toner images previously transferred onto the intermediate transfer belt 4. Finally, a multi-color toner image, not yet fixed, which is formed by superposing those toner images on another, is formed on the intermediate transfer belt 4.

A recording medium, e.g., a recording paper P, is fed from a paper tray 8 to the secondary image transfer section at an instant that the intermediate transfer belt 4 carrying the multi-color toner image primarily transferred thereto reaches the secondary image transfer section.

When the recording paper P is transported in a state that it is nipped between the secondary image transfer roll 6 and the intermediate transfer belt 4, the toner image is secondarily transferred from the intermediate transfer belt 4 to the recording paper P under a transfer electric field developed by a transfer voltage applied to the secondary image transfer roll 6, the polarity of the transfer voltage being opposite to the charging polarity of the toner image.

The recording paper P having the toner image secondarily transferred thereonto is transported to a fixing unit 9. The fixing unit 9 heats, under pressure, the toner image to fix it onto the recording paper P. Here, an image forming process is completed. A discharger (not shown) for discharging the recording paper P having the toner image secondarily transferred thereto is located downstream of the secondary image transfer roll 6.

The secondary image transfer roll 6 is movable to and from the intermediate transfer belt 4 in the directions C with arrow heads. The secondary image transfer roll 6 comes in contact with the intermediate transfer belt 4 when the recording paper P approaches to the secondary image transfer roll 6, and it detaches from the intermediate transfer belt 4 when the recording paper P leaves the secondary image transfer roll 6. Upon completion of the secondary image transferring operation, the secondary image transfer roll 6 returns to its stand-by position. A cleaner 10, which is disposed facing the intermediate transfer belt 4, moves to and from the intermediate transfer belt 4 as the secondary image transfer roll 6 so does, to remove the toner image that is left while being not transferred to the recording paper P.

The intermediate transfer belt 4 passes around a drive roll 11, an idle roll 12, a secondary-image-transfer back-up roll 13 and a tension roll 14, and is transported in the direction B with an arrow head by the drive roll 11. The intermediate transfer belt 4 is provided with a control member (not shown) to control the position of the intermediate transfer belt 4 on various rolls, e.g., the drive roll 11 when viewed in the axial direction of each roll.

The surface of the drive roll 11 is coated with a high friction material to prevent the intermediate transfer belt 4 from slipping on the drive roll 11 when loads by the cleaner 10 and the secondary image transfer roll 6 are imparted onto the intermediate transfer belt 4.

In the color image forming apparatus using the intermediate transfer belt, a composite toner image (formed by superposedly transferring color toner images) is transferred onto the recording medium. Therefore, it can effectively prevent the misregistration among the color toner images and the image turbulence, which are essential to the image transfer method in which the color toner images are directly successively transferred from the latent image carrier onto the recording medium.

There are various proposals to prevent a variation of the peripheral speed of the intermediate transfer belt 4 when it travels, to control the intermediate transfer belt 4 to a predetermined position on the drive roll 11, for example, in its axial direction and to prevent breakage occurring at the ends of the intermediate transfer belt 4.

One of the proposals is disclosed in Japanese Patent Unexamined Publication No. Hei. 2-27383. In the proposal, a rib is provided on one of the ends of the intermediate transfer belt which is located outside the image forming area on the intermediate transfer belt. Grooves are formed in the related rolls including the drive roll, in association with that rib. A coefficient of friction of the rib is selected to be different from that of the intermediate transfer belt. Another proposal is disclosed in Japanese Patent Unexamined Publication No. Hei. 4-257888. In this proposal, ribs are provided on both ends of the belt passing about the drive roll and the follower roll. Grooves are formed in both ends of the drive roll and the follower roll, in association with the ribs.

Japanese Patent Unexamined Publication No. Hei. 5-134556 discloses yet another proposal. The publication discloses such a transfer belt in which a tape as a reinforcing member is bonded to the end of the transfer belt. The outside diameter of the roll is reduced at the portion thereof corresponding in position to the tape to prevent crack occurring at the boundary between the transfer belt and the reinforcing member by suppressing the rising of the transfer belt at a location where the roll is in contact with the bonded tape.

An additional proposal is disclosed in Japanese Patent Unexamined Publication Nos. Hei. 9-175686 and Hei. 9-16512. In this proposal, the transfer belt and the rib are joined together by stitching to prevent the rib from slipping off the transfer belt.

A technique for preventing the intermediate transfer belt from slipping on the drive roll is disclosed in Japanese Patent Unexamined Publication No. Hei. 6-35331. In this publication, the surface of the drive roll is made irregular in height ranging from 20 to 100 $\mu$m. Another slip-preventing technique is disclosed in Japanese Patent Unexamined Publication No. Hei. 8-152812. In this publication, the inner surface of the intermediate transfer belt and/or the surface of the drive roll is entirely or partly coated with adhesive or high friction resin.

In the image forming apparatus which includes the intermediate transfer belt and the drive roll for driving it, the rib for preventing a zig-zag motion of the intermediate transfer belt, and the rib guide, the intermediate transfer belt is a semiconductive film of 50 to 100 $\mu$m thick, which consists of a base of polycarbonate or polyimide resin and a resistance adjusting material. The surface of the drive roll is generally processed to have a high friction to prevent slippage between the surfaces of it and the belt.

For the process to secure the high friction surface of the drive roll, the surface of an aluminum roll is coated with high friction resin of, for example, urethane rubber, whereby the drive roll and the intermediate transfer belt maintain their high friction for a long time. However, when the drive roll and the belt are new or nearly new, the friction coefficient of the surface of the drive roll is excessively high, and the belt repeats the stick slip on the drive roll in its axial direction to possibly squeak.

During when the intermediate transfer belt passing around a plurality of rolls travels, it moves in the axial direction of the roll (this motion is called a walk). The combination of the rib and the rib guide controls the walk so as not to be in excess of a predetermined amount of walk. However, when a state that the rib and the rib guide push each other by the walk continues for a long time, the ends of the intermediate transfer belt, if not sufficient in mechanical strength, will be broken, and if broken, the image forming apparatus fails to continue its image forming operation.

Such a strong force as to break the intermediate transfer belt is caused by degradation of the flatness of the belt system, which is due to poor levelness of the apparatus per se, twists caused by the stacking of component parts on the front and rear side plates of the apparatus per se and assembling errors, the circumferential length difference between both sides of the ends of the belt, and the like. However, there is a possibility that the intermediate transfer belt as the image carrier in the image forming apparatus is broken by the cause proper to the intermediate transfer belt.

A mechanism to break the intermediate transfer belt will be described. The combination of a new drive roll and a new intermediate transfer belt has a high coefficient of friction, and hence a high gripping force is also created. Therefore, when the rolls supporting the intermediate transfer belt lose their alignment (parallelism of the axes of the rolls), the belt is liable to walk even if the misalignment is slight. In this case, the moving belt shifts sideways for a short time or after it has traveled several tens cycles, and the rib abuts against the rib guide by a strong gripping force.

At a position where the belt is put on the drive roll and at a position where the belt leaves the drive roll, the following forces act on the side face of the rib. FIG. 14 is a cross sectional view showing the intermediate transfer belt 4 put on the drive roll 11, and FIG. 15 is a cross sectional view showing a contact state of the drive roll 11 with the intermediate transfer belt 4. In those figures, to prevent the walk of the intermediate transfer belt 4, ribs 41 are provided on both sides of the back surface of the intermediate transfer belt 4 in a state that it is in contact with the side faces of the drive roll 11.

When the intermediate transfer belt 4 walks and comes in contact with the side face of the drive roll 11, a force F1 acts on the side face of the rib 41 in a region R1 in which the intermediate transfer belt 4 begins to contact with the drive roll 11. The force F1 acts so as to cause the intermediate transfer belt 4 to rise and run onto the drive roll 11. In a region R2 where the lifted intermediate transfer belt 4 leaves the drive roll 11, a force F2 acts on the side face of the rib 41, so that the intermediate transfer belt 4 descends to its normal level.

FIG. 17 is a cross sectional view showing the intermediate transfer belt 4 when it suffers from a rise. The intermediate transfer belt 4 is lifted by the force F1, while at the same time a strong pushing force acts on the side face of the rib 41, whereby a rise RU is formed. This rise RU disappears in the region R2. In the vicinity of the drive roll 11, the side ends of the intermediate transfer belt 4 are repetitively deformed alternately in one direction and the other direction that is opposite to the former: the side ends of the belt are repetitively subjected to an alternate process of the concentration and release of stress.

The force that presses the rib 41 against the side face of the drive roll 11 increases as the gripping force is larger and the alignment decreases in its accuracy, and when this force is large, the intermediate transfer belt 4 is liable to rise. When the rib 41 is pressed against the side face of the drive roll 11, the intermediate transfer belt 4 is subjected to the alternate process of the stress concentration and release, and further the intermediate transfer belt 4 rubs with the drive roll 11 to generate squeak.

If the alternate concentration and release of stress is repeated in the rise portion RU and in this state the operation of the image forming apparatus continues, a fatigue is accumulated in the rise portion RU to give rise to a crack CR (FIG. 18). The local crack CR grows into a breakage of the whole intermediate transfer belt 4. Further, there is a danger that a notch N of the end of the intermediate transfer belt 4 easily grows to the breakage of the whole intermediate transfer belt 4 (FIG. 19).

To prevent the walk of the intermediate transfer belt, it is necessary to secure accurate working of component parts and assembling of them. To this end, it is required that the rolls supporting the intermediate transfer belt are exactly aligned to one another, the intermediate transfer belt is accurately worked to have little difference of its circumferential length between the sides of the ends of the belt.

The approach of improving the mechanical precision of the intermediate transfer belt and its related rolls brings about the complexity of the steps of working, assembling and adjustment. In this respect, the approach is not suitable for the mass production of the image forming apparatuses. If the problems in the manufacturing stage are solved, the following problem is still present; when the image forming apparatus is installed on a place of poor levelness, it is impossible to secure the required accuracy of the alignment among the rolls that support the intermediate transfer belt.

To prevent the walk problem, it is necessary to strictly manage the precision of the component parts and assembling of them as stated above. Further, some measure for improvement must be taken for other factors that will cause the walk producing the strong pushing force, e.g., gripping force.

Further, as described above, the conventional technique reinforces the belt ends by use of a tape or the like applied thereto, to thereby protect the belt from being cracked. This belt protecting technique has the following disadvantage, however. The reinforcing tape is deformed every time the intermediate transfer belt passes each roll supporting the former, and will be peeled from the belt ends.

Furthermore, as described above, the toner images of different colors are composed by superposing these color toner images one on another. Therefore, it is essential to accurately register those color toner images or to prevent a misregistration of those color toner images (referred to frequently as a color misregistration). To this end, it is necessary to accurately detect the reference position on the intermediate transfer belt and to control the operations of the related portions in the image forming apparatus in accordance with the detecting signal indicative of the reference position.

To detect the reference position, the conventional technique detects a paint or a tape on the intermediate transfer belt, reads a marking (e.g., a through-hole) on the belt by use of a reflection type sensor, or reads a rotation position on the drive roll for the belt by use of an encoder.

In the reference-position detecting method using the marking of the through-hole, stress concentrates at the through-hole, possibly cracking the intermediate transfer belt. In the detecting method of reading the rotation position of the drive roll, an error that arises from slippage between the belt and the drive roll is liable to occur. In this respect, the detecting method using the paint or tape is superior to the remaining detecting methods.

However, the method using the paint or tape has the following problem. To reduce the misregistration of the color toner images, it is necessary to detect the marking of the paint or tape considerably accurately. For example, when the color misregistration is reduced to 125 $\mu$m, the marking detection error should be within 15 $\mu$m.

To satisfy such a strict requirement, it is necessary to eliminate various factors causing detection errors, such as the moving speed of the intermediate transfer belt, the bending or vibration of the intermediate transfer belt during its traveling, and the mounting position of the reflection type sensor.

SUMMARY OF THE INVENTION

Accordingly, an object of the present invention is to provide an image forming apparatus which is free from such problem that the forces produced when the endless belt walks and the rib comes in contact with the rolls, deforms and breaks the endless belt as the image carrier.

Another object of the present invention is to provide an image forming apparatus which can reliably reinforce the ends of the endless belt, whereby the belt is free from its deformation, and protected against its breakage.

Yet another object of the present invention is to provide an image forming apparatus which can accurately detect the reference position on the endless belt to reproduce a good multi-color image free from the color misregistration.

According to one aspect of the invention, there is provided an image forming apparatus having an endless belt as a toner image carrier for holding a toner image thereon and transporting the same, and belt supporting means including a plurality of rolls for supporting the endless belt, the image forming apparatus comprising: rib members provided on and along both side ends of an inner surface of the endless belt; rib guide members, provided on both ends of a drive roll of the belt supporting means, for guiding the rib members; and a friction-reduced portion for reducing friction between the endless belt and the drive roll such that the friction at the ends of the drive roll (when viewed in the axial direction of the drive roll) is smaller than that in a central portion of the drive roll.

With such a structural construction, friction between the endless belt and the drive roll is reduced at the ends of the drive roll, and hence gripping force is reduced at the ends of the roll. As a result, the gripping force which is liable to increase at the side ends of the endless belt can be uniformized over the drive roll in its axial direction.

According to another aspect of the invention, there is provided an image forming apparatus having an endless belt as a toner image carrier for holding a toner image thereon and transporting the same, and belt supporting means including a plurality of rolls for supporting the endless belt, the image forming apparatus comprising: belt reinforcing tapes provided on and along both side ends on an outer surface of the endless belt and including overlapping portions where both ends of the belt reinforcing tape overlap each other, the overlapping portions being disposed in a forward direction with respect to each sliding member.

Thus, the belt reinforcing tapes provided on the outer surface of the endless belt allow the sliding members sliding on the tape to smoothly pass the lapping portions of the tape.

According to yet another aspect of the invention, there is provided an image forming apparatus having an endless belt as a toner image carrier for holding a toner image thereon and transporting the same, and belt supporting means including a plurality of rolls for supporting the endless belt, the image forming apparatus comprising: frame means for supporting a belt device including the endless belt; a belt-position indicating mark member provided on an outer surface of the endless belt; and optical detecting means for detecting the mark member, the optical detecting means being oppositely disposed at both ends of the endless belt while being fixed to the frame means.

Thus, the endless belt is supported by the frame means, and the optical detecting means is fixed to the frame means. Therefore, the distance between the optical detecting means and the endless belt and an angle of the detecting means relative to the endless belt may be maintained at fixed ones.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 6 is a cross sectional view showing a contact of a drive roll with an intermediate transfer belt in a structure including the drive roll and the intermediate transfer belt;

FIG. 7 is an enlarged view showing a gap forming structure in which the diameter of each end of the drive roll is larger than that of the remaining portion of the same;

FIG. 8 is a graph showing variations of the rise with respect to the alignment while using the diameter of the drive roll end as a parameter;

FIG. 36 is a table showing a total sensing error of a reflection type sensor;

FIG. 37 is an enlarged view showing a conventional butting portion of the rib;

FIG. 38 is an enlarged view showing a butting portion of the rib in connection with a reflection type sensor in the third embodiment;

DETAILED DESCRIPTION OF THE PREFERRED EMBODIMENTS

<First Embodiment>

Figure 13:
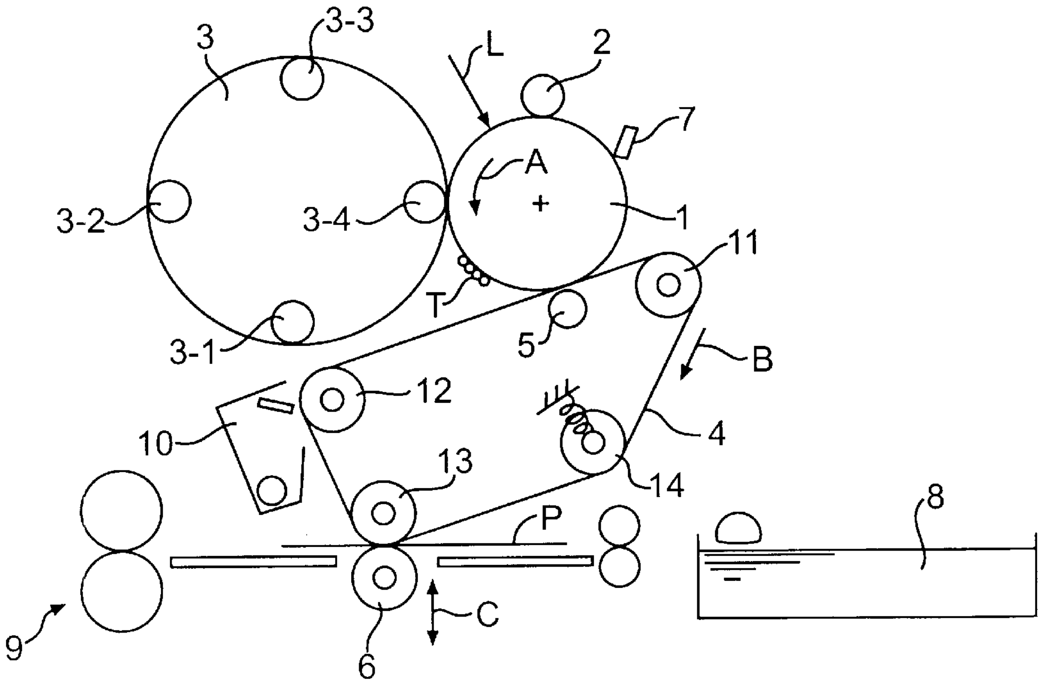
FIG. 13 PRIOR ART
FIG. 13 is a diagram schematically showing a model of a color printer which is an example of the image forming apparatus using the belt-like intermediate transfer belt.
Figure 14:
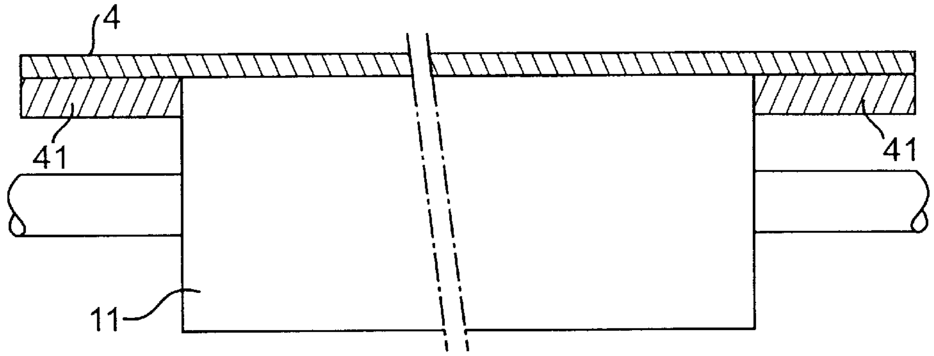
FIG. 14 is a cross sectional view showing an intermediate transfer belt put on the drive roll.

A first embodiment of the present invention will be described with reference to the accompanying drawings. The first embodiment takes the form of a color image forming apparatus. In the description of the first embodiment, FIG. 13 will also be referred to since the construction and operations of the image forming apparatus, which have been described in connection with FIG. 13, will frequently be used.

Figure 20:
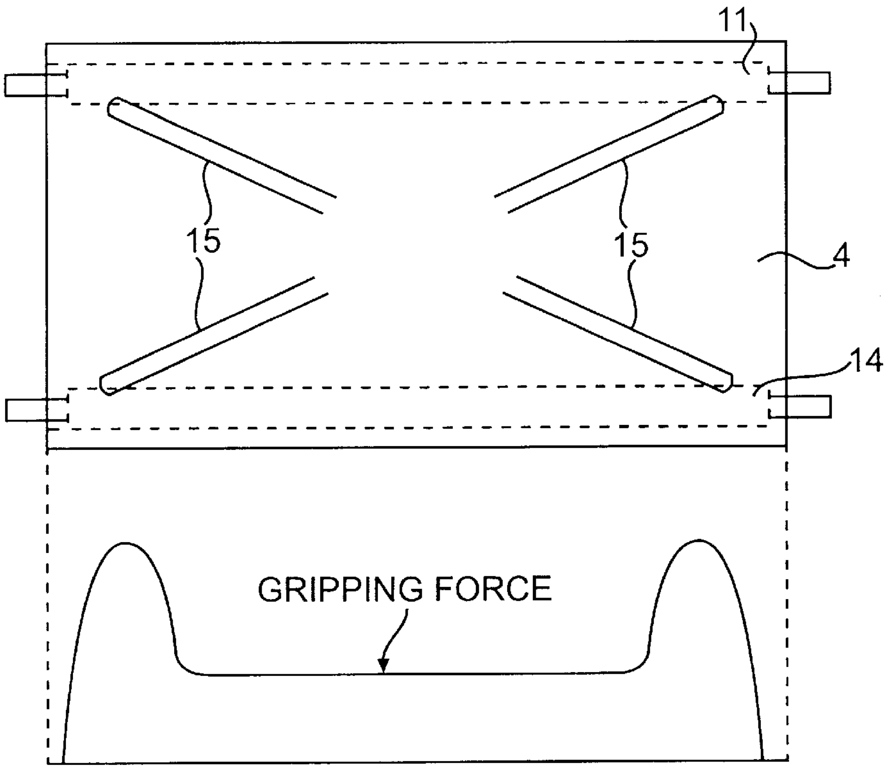
FIG. 20 is a diagram useful in explaining a state of tension exerted on an intermediate transfer belt wound on the rolls.

FIG. 20 is a diagram useful in explaining a state of tension exerted on an intermediate transfer belt tensely wound on rolls. When the intermediate transfer belt 4 is wound on a drive roll 11, an idle roll 12, a tension roll 14 and a secondary-image-transfer back-up roll 13, and tightened, then tension lines 15 appear on the intermediate transfer belt 4. The tension lines 15 are "creases" of the intermediate transfer belt 4, which are caused by a non-uniform distribution of tension in the intermediate transfer belt 4. The "creases" teach that a tension distributed in each side end of the intermediate transfer belt 4 is larger than that in the central porion thereof. With the tension difference, a gripping force Cr is distributed over the drive roll 11 in its axial direction as shown. As seen, the gripping force Cr is considerably large at both ends of the drive roll 11.

Figure 21:
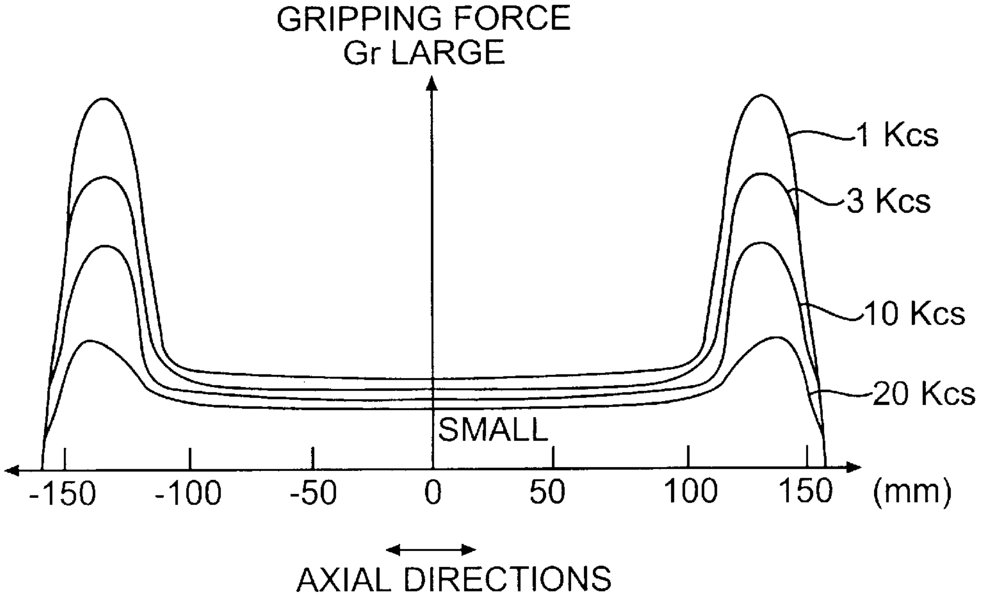
FIG. 21 is a graph showing variations of the gripping force over the drive roll in its axial direction, with a parameter being a time of using the intermediate transfer belt.

FIG. 21 is a graph showing variations of the gripping force Gr over the drive roll 11 in its axial direction. Four kinds of drive rolls 11 for the intermediate transfer belts 4 which are different in the use period or the number of belt cycles (in kilo cycles (kcs)) are measured for their distributions of gripping force Gr. As seen from the graph, the nonuniformity of the distribution of the gripping force Gr is greater, the newer the drive roll 11 is. When the use time is long, a variation of the gripping force Gr over the drive roll 11 in its axial direction becomes small in its magnitude.

Figure 22:
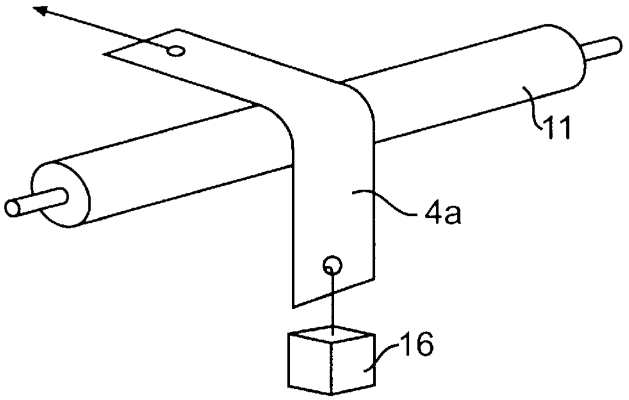
FIG. 22 is a diagram showing the way of measuring a distribution of gripping force over the drive roll.

The distribution of the gripping force Gr over the drive roll 11 in its axial direction was measured in a manner as illustrated in FIG. 22. In the measurement, a test piece 4*a* of the intermediate transfer belt 4 was put at a position on each sample drive roll 11 and a weight 16 was suspended from one end of the test piece 4*a*. In this state, the other end of the test piece 4*a* was pulled. When the test piece 4*a* slips on the drive roll 11, a tension, or a static friction force, was measured. The measured one was used as the gripping force Gr. Another measurement was performed at another position on the drive roll 11, which is shifted from the first position in the axial direction of the drive roll 11, and then at still another position, and so on. In this way, the measurements were performed at the required positions on the drive roll 11. Then, the remaining sample drive rolls were measured in a similar manner to gather their distribution data of the gripping force Gr.

Figure 23:
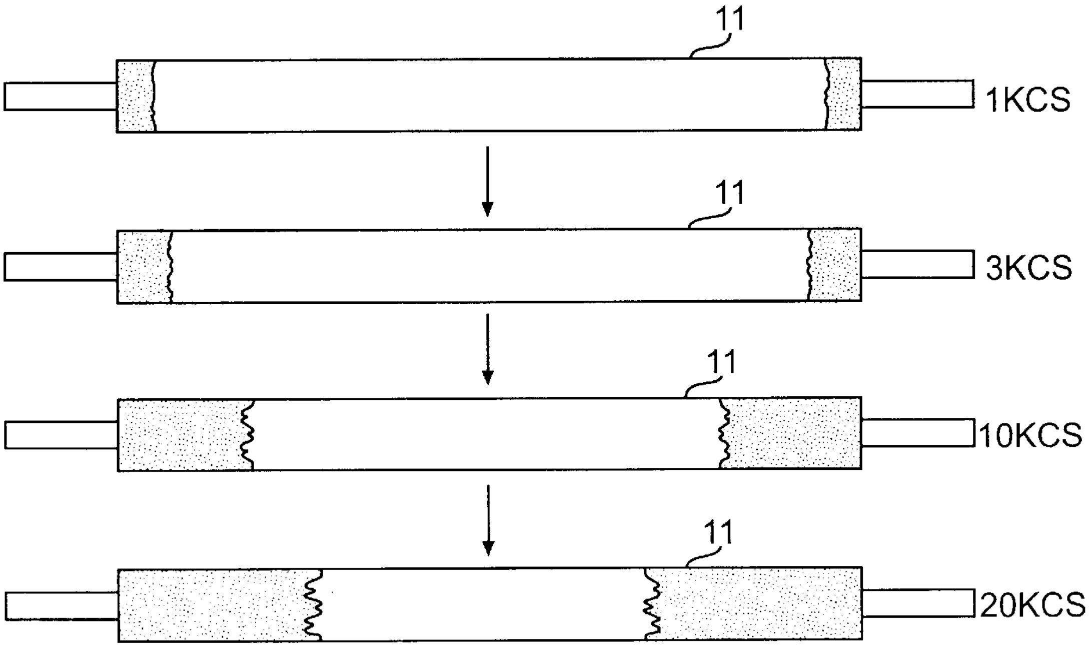
FIG. 23 is a diagram showing how the dirt on the surface of the drive roll increasingly expands with its use time.

The dirt on the surface of the drive roll 11 also produces a non-uniform distribution of the gripping force Gr over the drive roll 11 in its axial direction, in addition to the non-uniform distribution of tension over the drive roll. FIG. 23 is a diagram showing how the dirt on the surface of a drive roll 11 increasingly expands with its use time. As seen, the dirt expands from both ends of the drive roll 11. The dirt is mainly due to the scraping of the surface of the intermediate transfer belt 4. Toner particles floating within the machine also contributes to the formation of the dirt. At about 10 kcs, the dirt extends over the full axial length of the drive roll 11 and is saturated.

Figure 18:
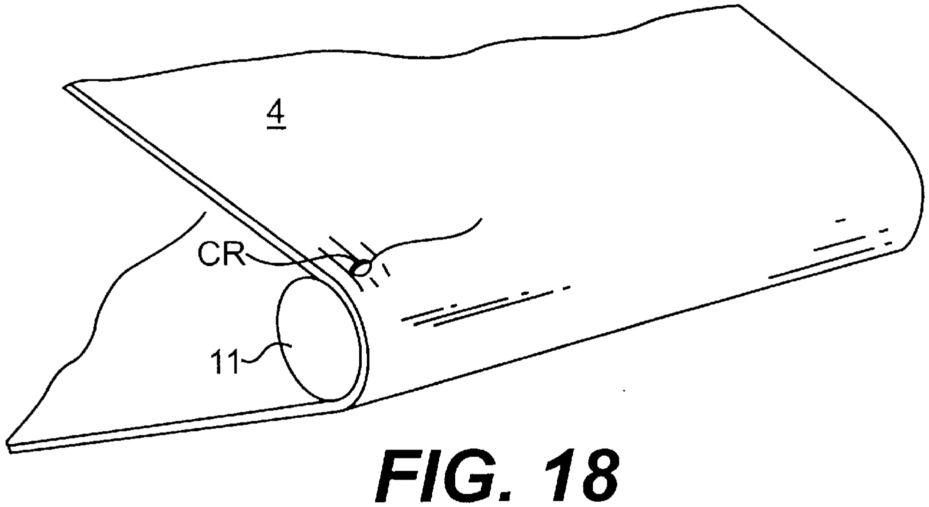
FIG. 18 is a diagram showing an example of crack on the end part of the intermediate transfer belt.
Figure 19:
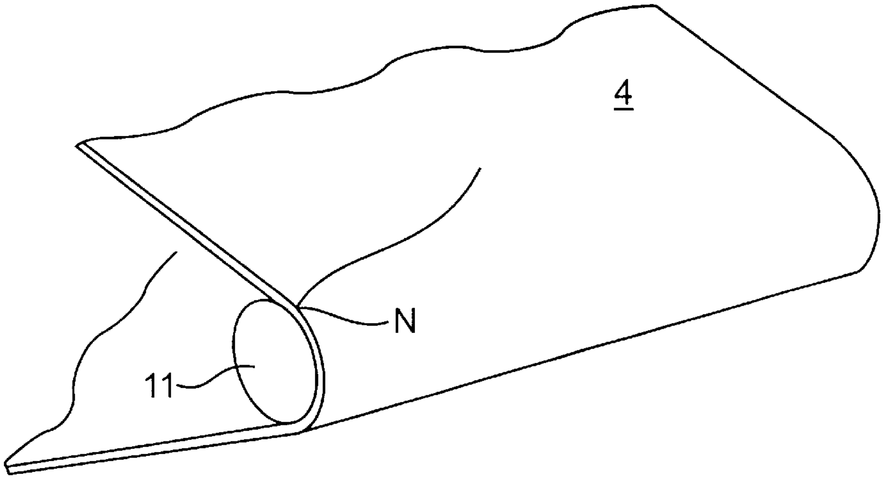
FIG. 19 is a diagram showing another example of crack on the end part of the intermediate transfer belt.

Thus, when the drive roll 11 is new, its gripping force Gr is large. Therefore, the side ends of the intermediate transfer belt 4 are repeatedly deformed by the walk of the intermediate transfer belt 4, and are liable to be damaged (FIGS. 18 and 19). If the tension roll 14 is loosened, the belt tension decreases in magnitude and then the gripping force Gr decreases. Therefore, loosening of the tension roll 14 is capable of preventing the damage of the intermediate transfer belt 4. However, if the gripping force Gr is excessively reduced, another problem, i.e., misregistration among the color toner images to be superposed on the intermediate transfer belt 4, arises.

Figure 16:
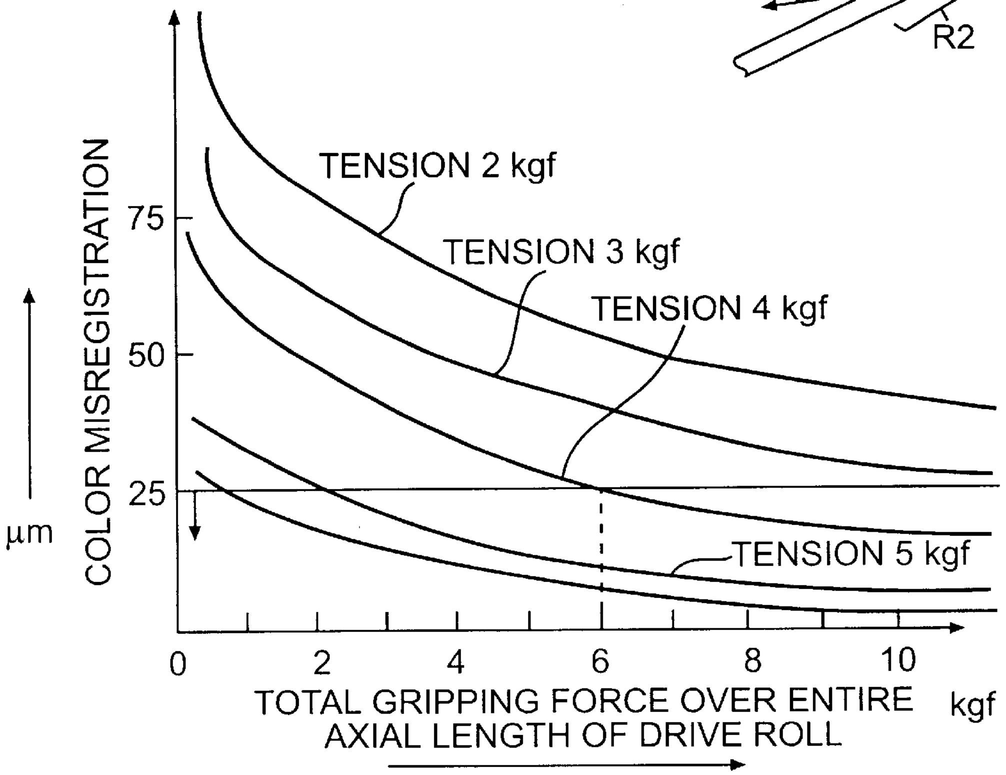
FIG. 16 is a graph showing variations of quantities of the color misregistration with respect to a total gripping force over the full axial length of the drive roll, with a belt tension as a parameter.
Figure 17:
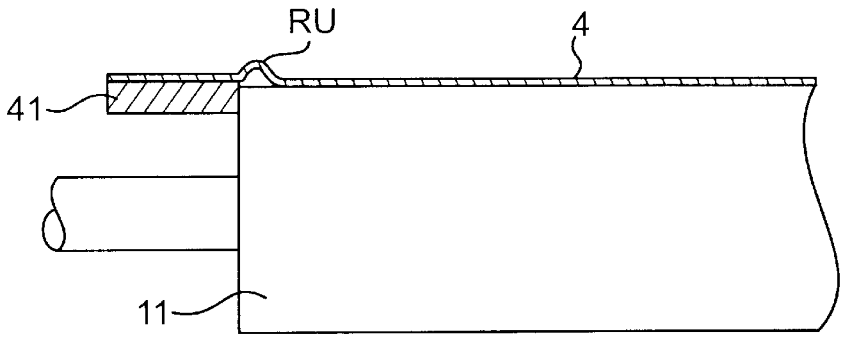
FIG. 17 is a cross sectional view showing the intermediate transfer belt when it suffers from a rise.

FIG. 16 is a graph showing variations of quantities of color misregistration with respect to a total gripping force over the full axial length of the drive roll 11, with a belt tension as a parameter. Here, the "total gripping force" means a static starting torque measured by a torque meter which is attached to the shaft of the drive roll 11 in a fixing state of the idle roll 12 and the intermediate transfer belt 4. In a case where the belt tension is 4 kgf, and of the tolerance of the color image misregistration of the whole image forming apparatus, 25 μm, for example, is assigned to the intermediate transfer belt 4, the total gripping force is at least 6 kgf as seen from the FIG. 16 graph.

As described above, the dirt on the surface of the drive roll 11 is saturated at about 10 kcs. Therefore, the total gripping force must be set at least 6 kgf for the use period of 10 kcs or larger. Where the number of belt cycles exceeds 10 kcs, the total gripping force is considerably large in an early stage where the dirt of the drive roll is not large. In this state, the deformation of the intermediate transfer belt 4 caused by the walk is unavoidable. The damage of the intermediate transfer belt 4 occurs in the early stage of large gripping force.

To reduce the color misregistration and to prevent the damage of the intermediate transfer belt 4, the present embodiment takes the following measure. The gripping force Gr is large at both ends of the drive roll 11, and this phenomenon is distinguished in particular in the early stage of using the drive roll. For this reason, the ends of the drive roll are processed to be low in friction in the embodiment.

FIG. 6 is a cross sectional view showing a structure including the drive roll 11 and the intermediate transfer belt 4. As shown, the drive roll 11 includes a roll body 11*a* and a high friction layer 11*b* applied to the surface of the roll body 11*a*. The high friction layer 11*b* is provided for preventing the intermediate transfer belt 4 from slipping on the drive roll 11 also when it receives a load from a cleaner 10 and a secondary image transfer roll 6. The roll body 11*a* may be a tube made of aluminum. The high friction layer lib maybe a layer of 5 to 50 μm, preferably 25 μm, made of polyurethane rubber.

A rib guide 17 is provided at each end of the drive roll 11. The rib guide 17 is made preferably of a resin material, e.g., polyacetal, which provides a smooth surface and a good sliding performance. It is suggestible that the rib guide 17 is separated from the side face of the high friction layer 11*b*. The same type of rib guide is provided on the idle roll 12 and the secondary-image-transfer back-up roll 13 in a similar fashion.

The intermediate transfer belt 4 is a semiconductive film which is made of polyimide, and is 50 to 100 μn in thickness, $10^9$ to $10^{12}$ Ω.cm in volume resistivity, and $10^{11}$ to $\mathbf{10}^{13}$ Ω/□ in surface resistivity. The intermediate transfer belt 4 may be made of acrylic resin, vinyl chloride resin or polycarbonate resin containing electric resistance stabilizing agent if it belongs to a semiconductive resin material of which the values of the thickness, volume resistivity, and surface resistivity are within the above-mentioned ones.

Ribs 41 are provided on the both ends of the inner surface of the intermediate transfer belt 4, i.e., the surface opposite to the image carrying surface of the belt 4. The inner sides of the ribs 41, i.e., the faces of these ribs located closer to the center of the drive roll 11 when viewed in the axial direction thereof, abut on the ends of the rib guides 17 provided at both ends of the drive roll 11 to limit the motion of the intermediate transfer belt 4 on the drive roll 11 in the axial direction. Tapes 18 as reinforcing members for reinforcing the ends of the intermediate transfer belt 4 are bonded onto both ends of the outer side, i.e., the image carrying surface, of the intermediate transfer belt 4. Each tape may be a polyethylene terephthalate (PET) film of 50 to 100 μm thick.

Figure 1:
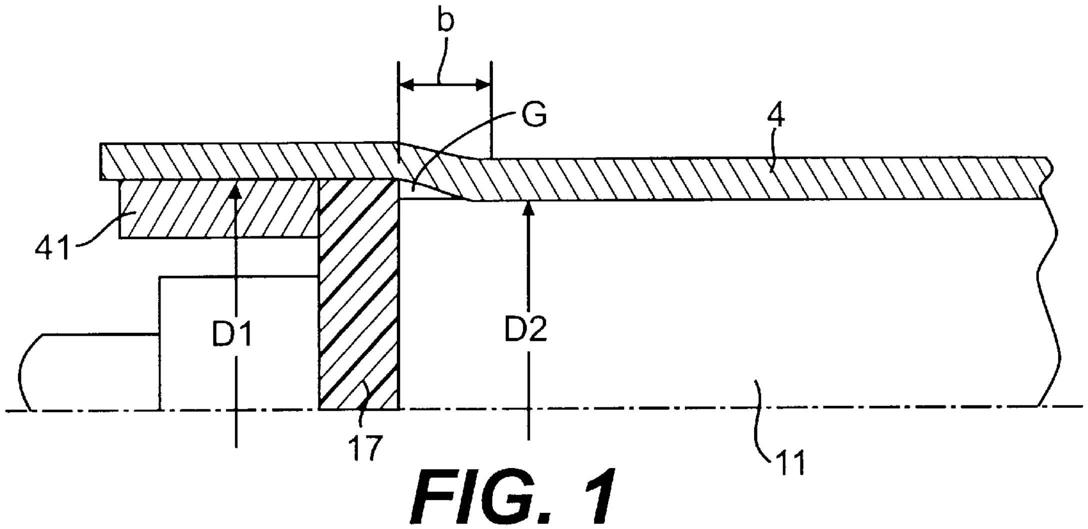
FIG. 1 is a cross sectional view showing a contact structure of a drive roll with an intermediate transfer belt in is 1 a first embodiment of the present invention.

In the vicinity of the ends of the drive roll 11, the rib guides 17 are increased in diameter and the diameter of each rib guide is larger than the outside diameter of the drive roll 11 for the purpose of friction reduction. FIG. 1 is an enlarged view showing a portion including one end of the drive roll. As shown, the diameter D1 of the rib guide 17 is slightly larger than the diameter D2 of the drive roll 11. A preferable range of the diameter difference will be described later with reference to FIG. 8.

Because of the presence of the diameter difference, a gap G is created between the end of the drive roll 11 and the back side or surface of the intermediate transfer belt 4 in a region b near the end of the drive roll 11. In the region b including the gap G, a friction created between the drive roll 11 and the intermediate transfer belt 4 is zero or considerably low. As a result, the gripping force of the drive roll 11 is reduced at the ends of the drive roll 11.

Figure 2:
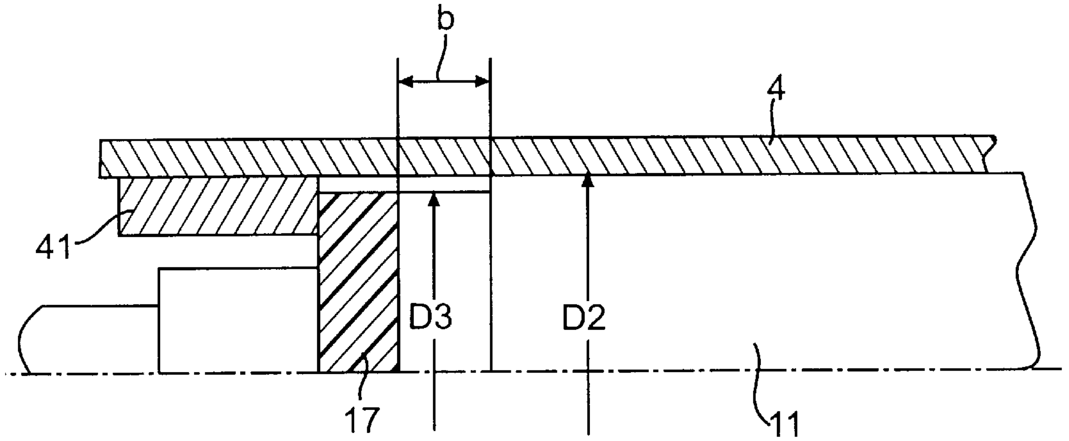
FIG. 2 is a cross sectional view showing another contact structure of the drive roll with the intermediate transfer belt.

In an alternative, the ends of the drive roll 11 may be reduced in diameter, while the rib guides 17 are increased in diameter in the instance described above. In FIG. 2, the diameter D3 of a portion of each end of the drive roll 11, which faces the back side of the intermediate transfer belt 4 and adjoins to the inner side of the corresponding rib 41, is slightly smaller than the diameter D2 of the remaining porion of the drive roll 11.

Figure 3:
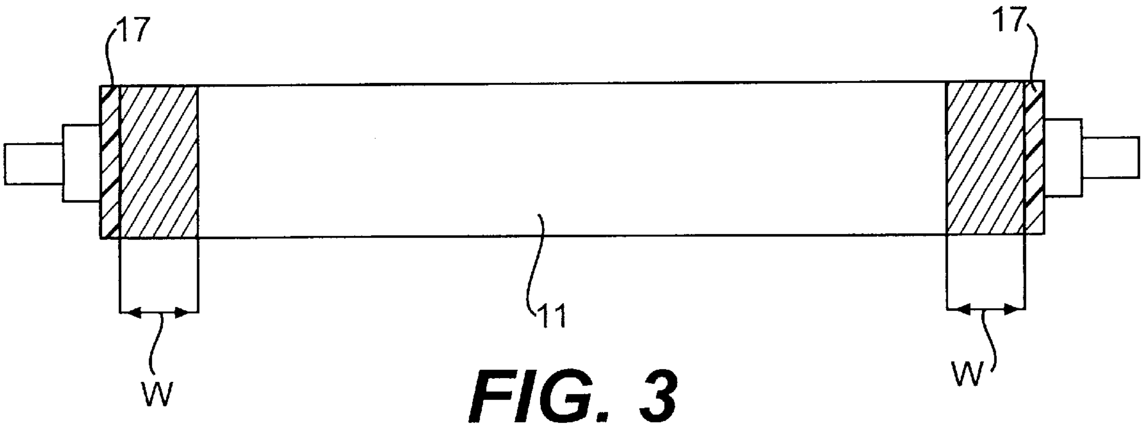
FIG. 3 is a view showing the drive roll with low friction members bonded thereto.

A drive roll 11 designed so as to have reduced friction will be described. The friction-reduced drive roll 11 is illustrated in FIG. 3. Both the end portions of the drive roll 1l are friction-reduced each over width W. The friction reduction may be realized by bonding a polyimide tape having a thickness of 50 μm to those portions. Provision of the friction-reduced portions, which are also denoted as W, accrues to technical advantages as will be described with reference to FIGS. 4 and 5.

Figure 4:
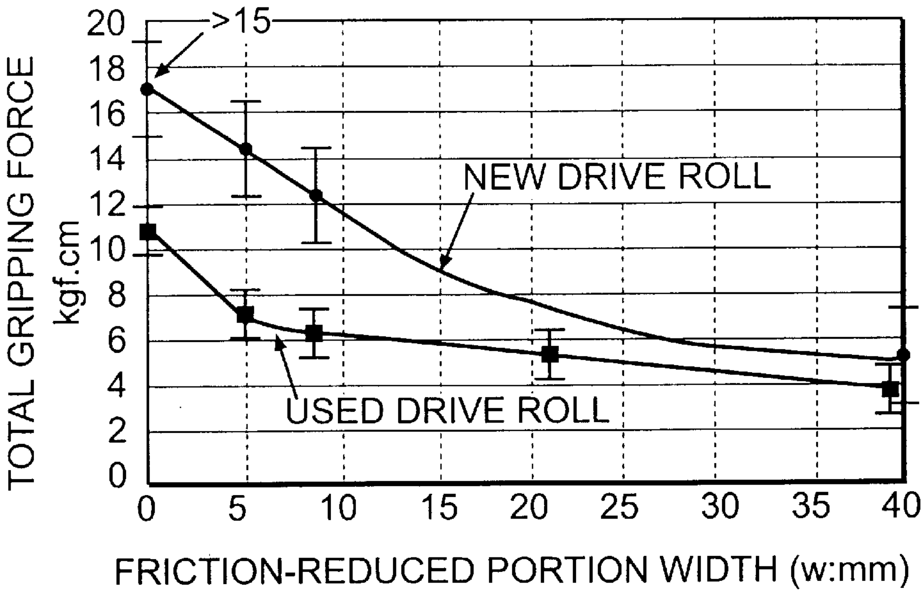
FIG. 4 is a graph showing relationships between a total gripping force and a friction-reduced portion width.

FIG. 4 is a graph showing relationships between a total gripping force and the friction-reduced portion width, the relationships being measured on two drive rolls 11; a new drive roll and a used drive roll. As seen, the total gripping force decreases with an increase of the friction-reduced portion width W. Therefore, the friction-reduced portion width W may be selected so as to secure a required minimum total gripping force in connection with a tolerance of the color misregistration.

Figure 5:
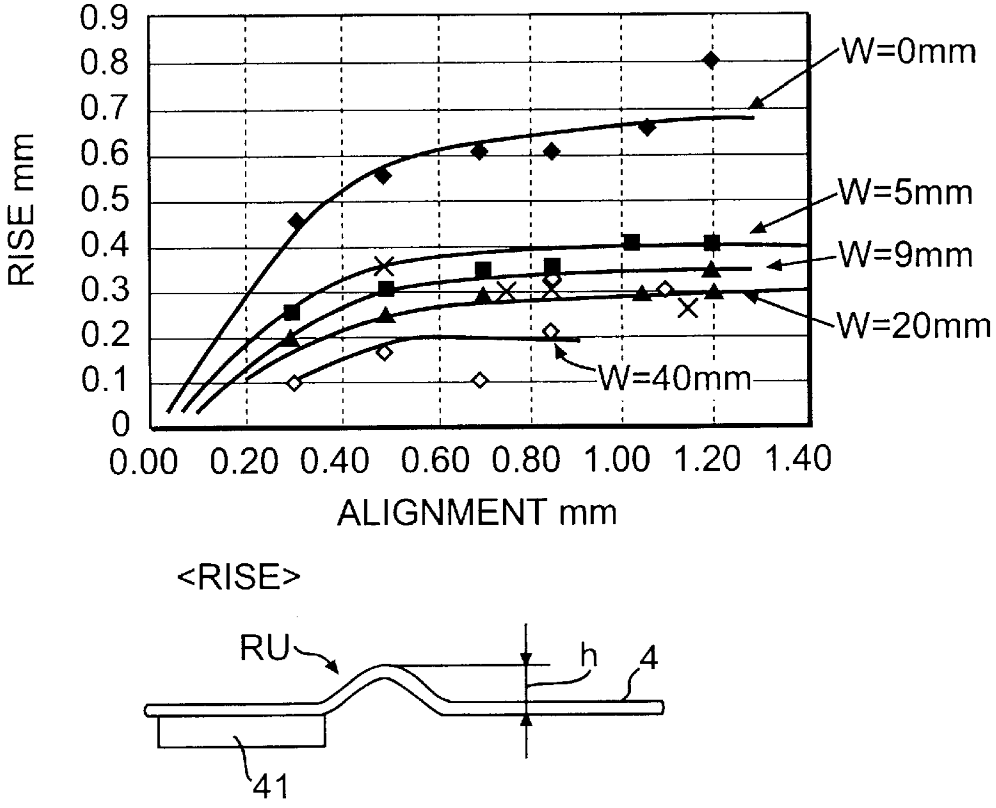
FIG. 5 is a graph showing relationships between the rise of the intermediate transfer belt and the alignment of the drive roll in connection with the friction-reduction width.

FIG. 5 is a graph showing relationships between the rise portion RU at the end of the drive roll 11 and the alignment, or the parallelism among the drive roll 11, idle roll 12, secondary-image-transfer back-up roll 13 and tension roll 14, while using the friction-reduced portion width W as a parameter. The "alignment" is a parallelism among the drive roll 11, the roll adjacent to the drive roll 11, i.e., the idle roll 12, and the tension roll 14. The alignment is measured in terms of a quantity of subtle slant of other rolls than the drive roll 11 with respect to the drive roll 11. As seen from the figure, the height h of the rise RU portion may be held down low even if the alignment is poor, by increasing the friction-reduced portion width W. It is desirable that the height h of the rise portion RU is low; however, the friction-reduced portion width W needs to be selected while securing the required minimum total gripping force.

The gap G may also be formed between the drive roll 11 and the intermediate transfer belt 4 by selecting the diameter of each end of the drive roll 11 to be larger than that of the remaining portion thereof, although the diameter of each of the rib guides 17 is selected to be larger in the instance mentioned above. FIG. 7 is an enlarged view showing the gap forming structure in which the diameter of each end of the drive roll is larger than that of the remaining portion of the same. As shown, the diameter D4 of the drive roll end is larger than that D2 of the remaining portion thereof.

FIG. 8 is a graph showing variations of the height h of the rise portion RU with respect to the alignment of the rolls while using the diameter D4 of the drive roll end as a parameter. In the graph, the diameter D4 of the drive roll end takes, for comparison, four different values inclusive of a value (of the diameter D4) smaller than of the diameter D2 by 0.17 mm. In the case of the drive roll in which the diameter of each end thereof is larger than that of the remaining portion thereof by 0.45 mm, the height h of the rise portion RU takes measured values distributed around about 0.2 mm with respect to the alignment. This fact implies that crack CR hardly occurs in the intermediate transfer belt (FIG. 20) if it is used for a longtime. The diameter difference between the rib guides 17 and the drive roll 11 can be determined on the basis of the experiment results of FIG. 8.

The friction reduction on the surface of the drive roll 11 may be realized in the following manner; the surface of the drive roll 11 is coated with fine particles for lubrication. The fine particles may be selected from among polyester finer particles used for binder of the developing toner, titanium oxide and silicon oxide fine particles used as additive to the toner, polymethyl methacrylate (PMMA) fine particles used as lubricant for the cleaner blade of the photosensitive drum 1, zinc stearate fine particles, polyimide polycarbonate fine particles used as a material of the intermediate transfer belt 4, and the like. The particle diameter of the fine particles may be within the range from 0.01 μm to 10 μm. Those kinds of fine particles are enumerated by way of example, and hence any kind of fine particles of the same family, which have a lubricant nature, may be used for the purpose of friction reduction.

Figure 9:
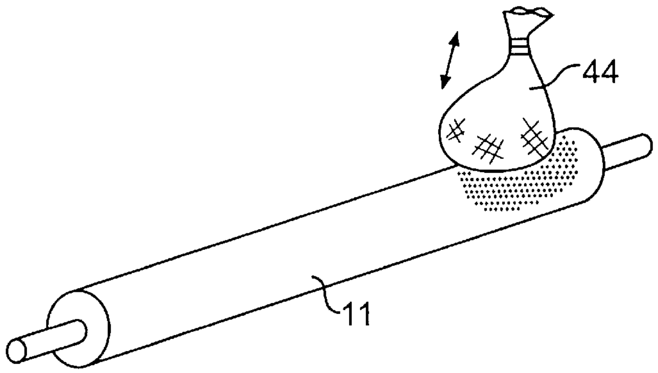
FIG. 9 is a diagram showing the applying of finer particles onto the surface of the drive roll.

The friction-reduced portions may be formed in a manner that both ends of the drive roll 11 are coated with the fine particles and the unnecessary coating of the fine particles is then wiped off. To apply the fine particles, the surface of the drive roll 11 is tapped with a bag (dusting pouch) containing the fine particles, for example. FIG. 9 is a diagram showing the applying of finer particles onto the surface of the drive roll by use of the dusting pouch 44.

Figure 10:
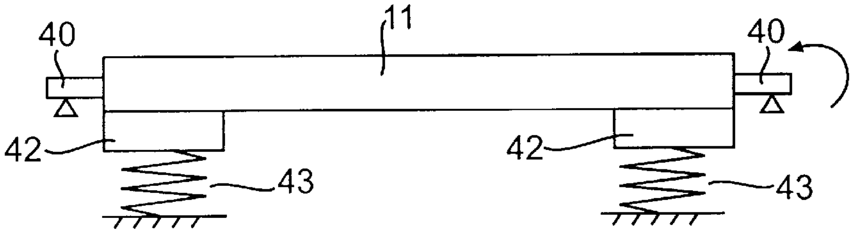
FIG. 10 is a diagram showing the way of wiping the unnecessary finer particles out of the surface of the drive roll after it is coated with the fine particles.

Subsequently, the unnecessary finer particles applied onto the surface of the drive roll 11 are wiped off. FIG. 10 is a diagram showing the way of wiping the unnecessary finer particles out of the surface of the drive roll after it is coated with the fine particles. In the figure, the drive roll 11 thus coated with the fine particles is set to a rotary machine and rotated about a shaft 40. Cleaning pads 42, which are located at both the ends of the drive roll 11, are pressed against the drive roll 11 by means of springs 43. The cleaning pad 42 may be constructed by bonding cloth made of polyester, for example, onto the surface of polyurethane foam sponge. The number of revolutions of the shaft 40 is preferably within the range of 10 to 20 rpm.

Figure 11:
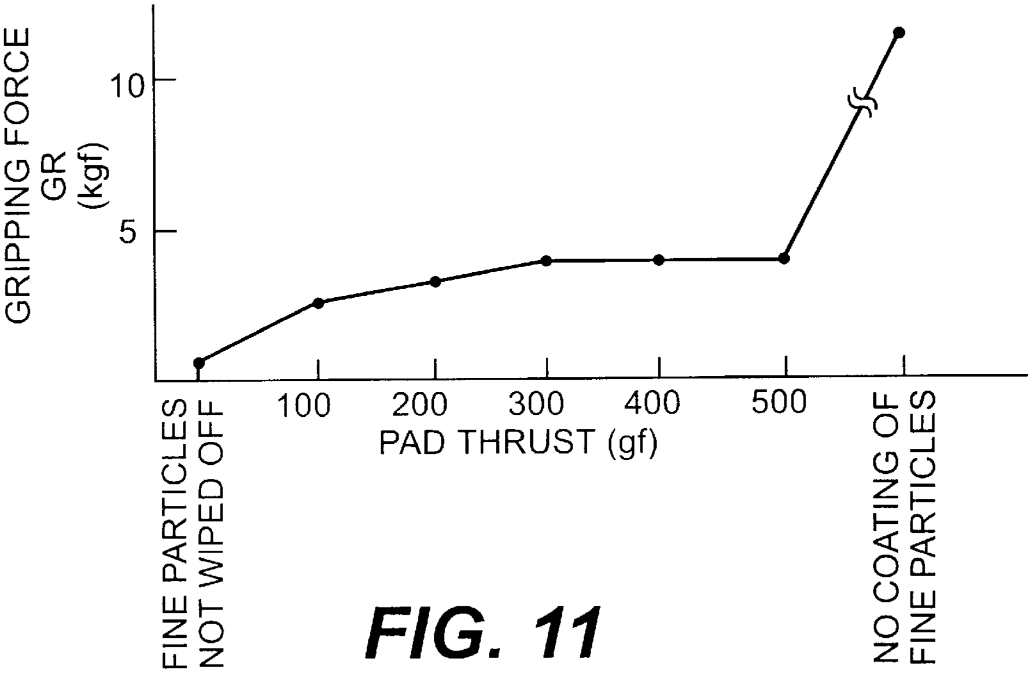
FIG. 11 is a graph showing a variation of a gripping force with respect to a thrust applied.

FIG. 11 is a graph showing a variation of the gripping force Gr at the end of the drive roll 11 after the unnecessary fine particles are removed with respect to a thrust applied when the unnecessary fine particles are wiped out. In the illustrated instance, the average particle diameter was 5 $\mu$m; the thrust was 100 gf; and the number of revolutions of the drive roll 11 was 20 rpm. As seen from the graph, when the drive roll coated with the fine particles is not wiped out, the drive roll well slips and hence it exhibits a little gripping force Gr. A new drive roll 11 not coated with the fine particles exhibits a great gripping force Gr. A drive roll in which it is coated with the fine particles and the unnecessary fine particles are removed exhibits a proper gripping force Gr.

Figure 12:
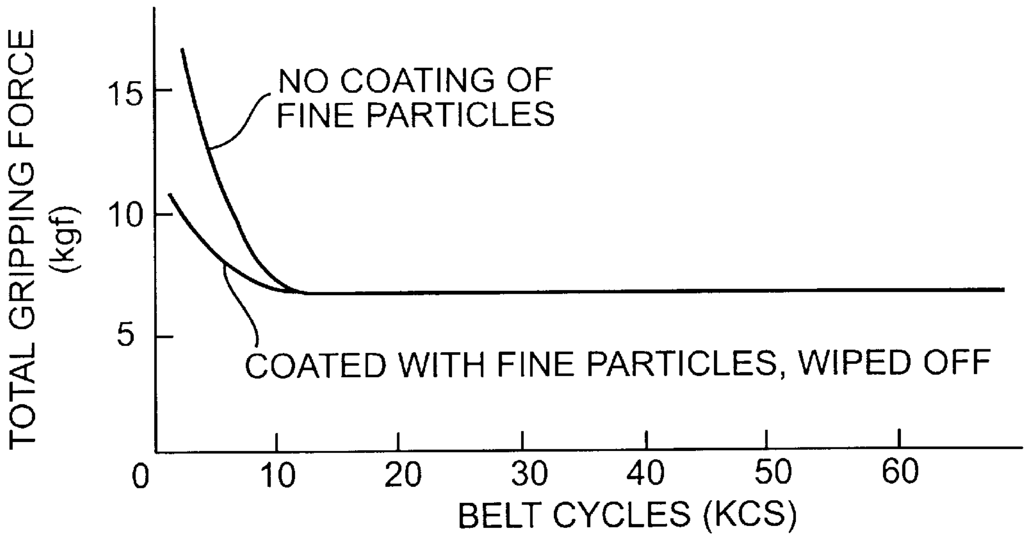
FIG. 12 is a graph showing a relationship between a total gripping force of the drive roll with respect to the number of cycles of the belt.

FIG. 12 is a graph showing a relationship between a total gripping force of a drive roll 11 after its unnecessary fine particles are removed with respect to the number of cycles of the belt. In the graph, a variation of the total gripping force of a drive roll not coated with fine particles is additionally depicted for comparison. As seen from the graph, in both the drive rolls, the total gripping force decreases with time of using the belt, and is settled down at about 10 kcs. In the case of the drive roll 11 after removal of its unnecessary fine particles, there is a little difference between the total gripping force in the early stage of the use time of the belt and that operated after the working time. The damage of the intermediate transfer belt 4 takes place at the highest probability around 10 kcs. In this region of the number of belt cycles, the total gripping force is held down relatively low. In the measurement for gathering data of FIG. 12, another friction reducing means, e.g., the increasing of the diameter of each rib guide 17, is not applied to the drive roll 11.

The friction reduction of the drive roll surface may be realized in a manner that the high friction layer 11*b* to be applied to the entire surface of the drive roll 11 is not applied to the end portions of the drive roll 11, while the roll surface is coated with the fine particles in the instance stated above.

Figure 15:
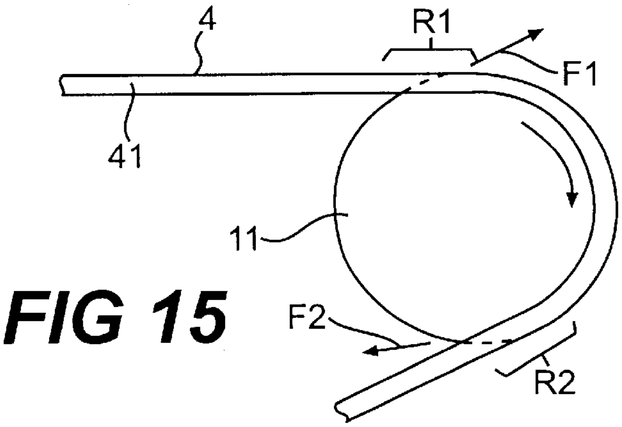
FIG. 15 is a cross sectional view showing a contact state of the drive roll with the intermediate transfer belt.

The above-mentioned embodiment maintains the required total gripping force and reduces the gripping force only at each end of the drive roll by a unique design of the shape and the surface state of the drive roll. Alternatively, a proper selection of the material of the ribs 41 of the intermediate transfer belt 4 is capable of reducing a sliding resistance of the ribs to the rib guides 17, of reducing the force F1 causing the intermediate transfer belt 4 to run onto the drive roll 11 (FIG. 15), and as a result, of reducing the height of the rise RU. The material of the rib 41 is preferably thermoset, and the rib 41 may be a sheet of polyurethane, 0.5 to 1.5 mm thick.

As seen from the foregoing description, in the image forming apparatus of the present invention, the gripping force of the drive roll, which is likely to increase at the ends of the endless belt, i.e., the intermediate transfer belt, can be made uniform over the drive roll in its axial direction. Therefore, the image forming apparatus succeeds in eliminating such an unwanted phenomenon that the endless belt walks on the drive roll and rises. As a result, there is no chance that the endless belt rises and is deformed repetitively, and finally is cracked.

<Second Embodiment>

Figure 24:
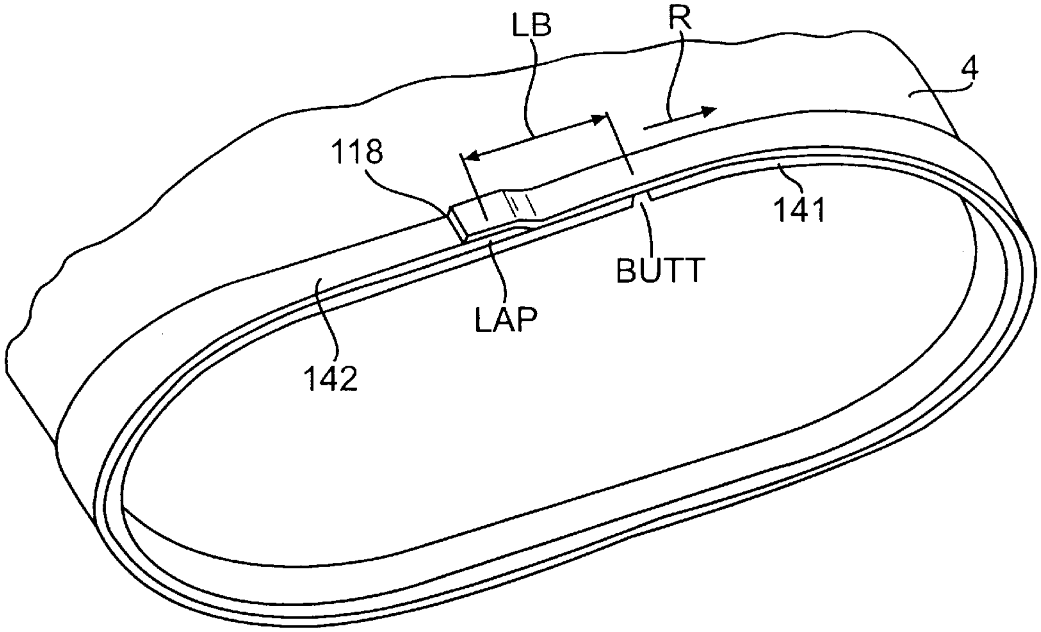
FIG. 24 is a perspective view showing one end of an intermediate transfer belt used in a second embodiment of the present invention.

A second embodiment of the present invention will be described. FIG. 24 is a perspective view showing one end of the intermediate transfer belt 4 used in the second embodiment. As shown, a rib 141 is firmly bonded to and along the edge of each end of the intermediate transfer belt 4. A belt reinforcing means, e.g., a tape 142, is bonded onto the outer side of the side end or the outer peripheral surface of the intermediate transfer belt 4. The rib 141 and the tape 142 include a butting portion BUTT and a lapping portion LAP, respectively.

A gap at the butting portion BUTT is sometimes extended up to 4 mm. A lapping margin at the lapping portion LAP is set to at least 10 mm in order to secure a reliable bonding. The center of the gap at the butting portion BUTT is separated from the center of the lapping portion LAP by a distance LB. The reason why the butting portion BUTT is shifted in position from the lapping portion LAP so as not to overlap each other follows.

The homogeneity in the butting portion BUTT and the lapping portion LAP is inferior to that in the remaining portions of the intermediate transfer belt 4 when viewed in the direction of its travel. In other words, such characteristics as unit strength and ductility in those portions of the intermediate transfer belt 4 are different from those in the remaining portions thereof. When the intermediate transfer belt 4 having those special portions overlapping each other passes the rolls associated therewith, it is liable to minutely vibrate, and the vibration may adversely affect the registration of the color images. Displacement of the butting portion BUTT from the lapping portion LAP lessens the difference of the characteristics between those special portions and the remaining portion of the intermediate transfer belt 4 (when viewed in the direction of its travel). The distance between the butting portion BUTT and the lapping portion LAP is selected such that the end-to-end distance is 7.5 mm or longer, preferably such a distance (e.g., 100 mm or longer) so as to cover a contact angle (lap angle) between the belt and the roll in order to avoid that the butting portion BUTT and the lapping portion LAP are simultaneously positioned at the drive roll 11 or the like.

Figure 32:
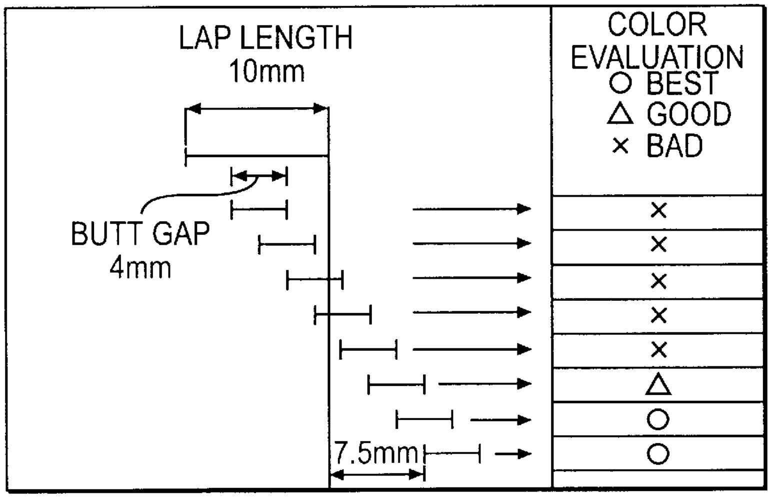
FIG. 32 is a diagram showing an evaluation of misregistration of the color images when the distance between the butting portions and the lapping portions is varied.

FIG. 32 is a diagram showing an evaluation of misregistration of the color images at the side end of an image forming area, i.e., the side end of the intermediate transfer belt 4, when the distance between the butting portion BUTT and the lapping portion LAP is varied. From the evaluation, it is seen that a tolerable color misregistration cannot be obtained till the end-to-end distance between the butting portion BUTT and the lapping portion LAP reaches 7.5 mm. In other words, the evaluation teaches that the BUTT to LAP distance should be set to at least 7.5 mm.

The lapping portion LAP is arranged such that the end face 118 of the tape 142, or the end face of the tape placed above the other end thereof in the lapping portion is located upstream in the direction R of the travelling of the intermediate transfer belt 4, or the front end face 118 is disposed in the forward direction with respect to structural objects (sliding members) which move in contact with the tape 142. The reason why the lapping portion LAP is thus arranged follows. Side seals (to be described later) are disposed on both sides of a cleaner blade of the cleaner 10 at the side ends of the outer peripheral surface of the intermediate transfer belt 4. If the front end face 118 of the tape is located downstream in the direction R of the travel of the intermediate transfer belt 4, the side seals serve as the sliding member and come in contact with the front end face 118, possibly to separate the tape 142 from the intermediate transfer belt in the lapping portion LAP. It is for this reason that the lapping portions LAP are thus arranged.

The intermediate transfer belt 4 is a semiconductive film which is made of polyimide or its family, and is 50 to 100 μm in thickness, $10^9$ to $10^{12}$Ω.cm in volume resistivity, and $10^{11}$ to $10^{13}$Ω/□ in surface resistivity. The intermediate transfer belt 4 may be made of acrylic resin, vinyl chloride resin or polycarbonate resin containing electric resistance stabilizing agent if it belongs to a semiconductive resin material of which the values of the thickness, volume resistivity, and surface resistivity are within the above mentioned ones.

The material of the rib 141 is preferably thermosetting resin, and the rib 141 maybe a sheet of polyurethane, 0.5 to 1.5 mm thick. Each tape 142 as the reinforcing member may be a polyethylene terephthalate (PET) film of 50 to 100 μm thick.

Figure 25A:
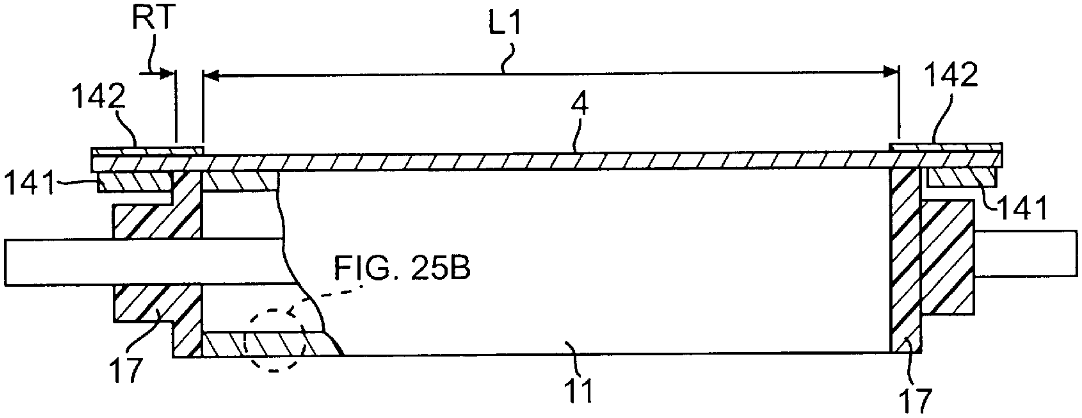
FIG. 25 is a cross sectional view showing a structure including the drive roll and the intermediate transfer belt.
Figure 25B:
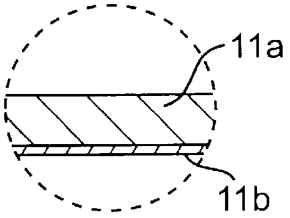

FIG. 25 is a cross sectional view showing a structure including the drive roll 11 and the intermediate transfer belt 4. As shown, the drive roll 11 includes a roll body 11*a* and a high friction layer 11*b* applied to the surface of the roll body 11*a* (see an enlarged view). The high friction layer 11*b* is provided for preventing the intermediate transfer belt 4 from slipping on the drive roll also when it receives a load from the cleaner 10 and the secondary image transfer roll 6. The roll body 11*a* may be a tube made of aluminum. The high friction layer 11*b* may be a layer, 5 to 50 μm, preferably 25 μm, made of polyurethane rubber. A rib guide 17 for guiding the ribs 141 in the direction of the belt traveling is provided at each end of the drive roll 11. The rib guides 17 limit the motion of the intermediate transfer belt 4 in the axial direction of the drive roll 11.

The rib guide 17 is made preferably of a resin material, e.g., polyacetal, which provides a smooth surface and a good sliding performance. It is suggestible that the rib guide 17 is separated from the side face of the high friction layer 11*b*. The same kind of rib guide is provided on the idle roll 12 and the secondary-image-transfer back-up roll 13 in a similar fashion.

To suppress the growing of a minute scratch on the side end of the intermediate transfer belt 4, it is desirable that the tape 142 is bonded to and along the intermediate transfer belt 4 so as to coincide, in configuration, the side end face of the tape with the side end face of the intermediate transfer belt 4. The inner side face of the tape 142 (i.e., the end face of the tape closer to the central part of the intermediate transfer belt 4 when viewed in the widthwise direction of the belt), is preferably located closer to the central part of the belt than the inner end face of the rib 141. By so doing, the following functions are secured; the function to protect the side ends of the intermediate transfer belt 4 and the function to suppress the occurrence of the rise portion RU of the intermediate transfer belt 4.

In connection with the drive roll 11, when the rib guide 17 of the drive roll 11 comes in contact with the rib 141, the inner side of the tape 142 is positioned closer to the central part of the drive roll 11 in its axial direction than the outer side end of the rib guide 17. An overlapping amount RT between the tape 142 and the rib guide 17 (FIG. 25) is preferably 2 mm or larger in a state that the rib guide 17 is in contact with the rib 141. The reason for this is that also when the intermediate transfer belt 4 walks on the drive roll and the rib guide 17 is abutted against the other rib 141, a sufficient overlapping amount RT must be secured.

The position setting condition for the tape 142 may be satisfied if the width of the tape 142 is increased. In this case, the following point must also be taken into consideration. The cleaner blade of the belt cleaner 10 is brought into contact with the surface of the intermediate transfer belt 4. Its contact range is broader than the image forming area when viewed in the widthwise direction. Therefore, the distance Li between the tapes 142 is selected to be longer than the length of the cleaner blade so as to eliminate the interference of the cleaner blade with the tapes 142.

Figure 31:
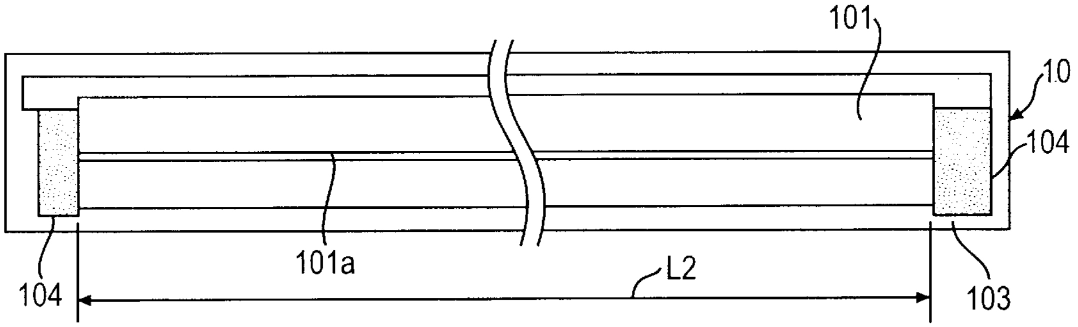
FIG. 31 is a front view showing a belt cleaner.

The cleaner blade will be described. FIG. 31 is a front view showing the belt cleaner 10. A cleaning blade 101 operates such that its edge 101*a* is brought into contact with the surface of the intermediate transfer belt 4 to scrape away residual toner off the belt surface. The length L2 of the cleaner 10 is selected so that the cleaner covers both ends of the maximum image forming area by about 10 mm for each end. That is, the distance L1 between the tapes 142 needs to be larger than the length L2.

Used toner scraped off by the cleaning blade 101 is received by a toner receptacle or a lower seal 102, and gathered into a housing 103. Side seals 104 are provided at both sides of the cleaning blade 101 and the lower seal 102 to prevent the used toner from leaking outside. The side seal 104 may take such a construction that fibers made of polypropylene are planted in a plate. The planted fibers are brought into contact with the surface of the tape 142. This is the reason why the lapping portion LAP of the tape 142 is located in the forward direction.

Figure 26:
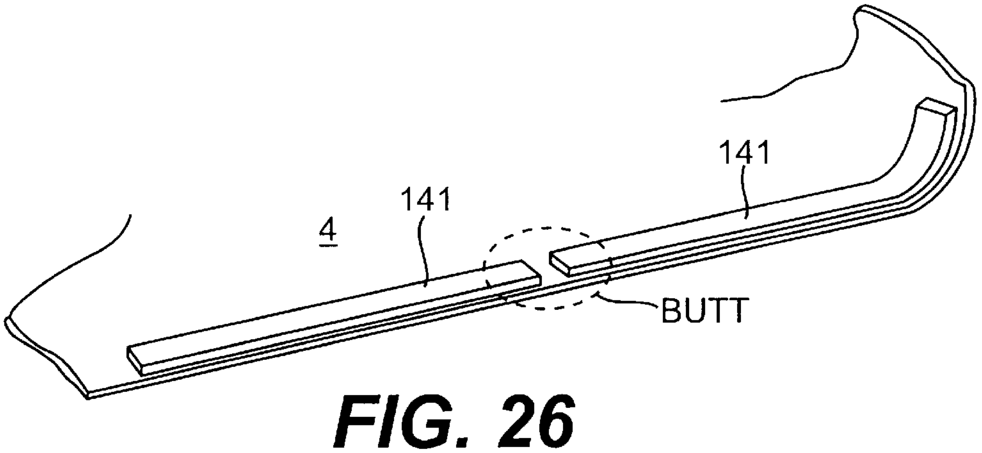
FIG. 26 is a perspective view showing a part of the intermediate transfer belt on which the butting portion of the rib is located.
Figure 27A:
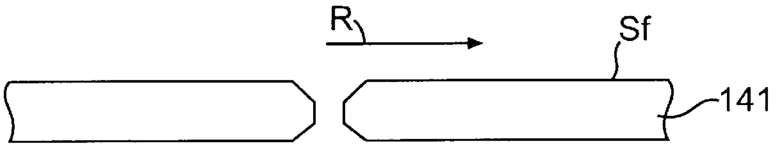
FIGS. 27(*a*) to 27(*d*) are enlarged plan views showing some examples of the configurations of the ends of rib in the butting portion.
Figure 27B:
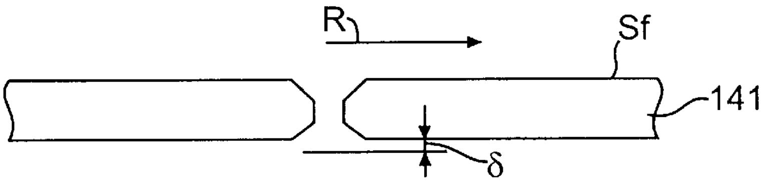
Figure 27C:
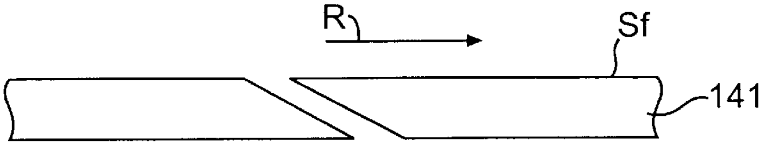
Figure 27D:
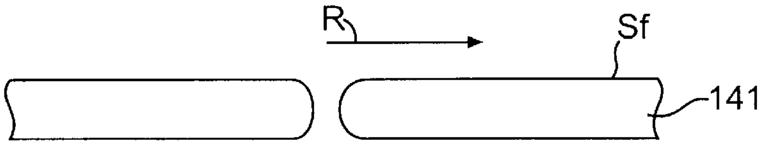

The butting portion BUTT of the rib 141 is constructed so as to allow the rib guide 17 to smoothly pass the butting portion BUTT. FIG. 26 is a perspective view showing a part of the intermediate transfer belt 4 on which the butting portion BUTT of the rib 141 is located. FIGS. 27(*a*) to 27(*d*) are enlarged plan views showing some examples of the configurations of the ends of the rib 141 in the butting portion BUTT. The ends of the rib 141 forming the butting portion BUTT are configured so as not to be caught by the end faces of the rolls as sliding members to the rib 141. The rib ends are bevelled (FIG. 27(*a*)); obliquely slanted in a complementary fashion (FIG. 27(*c*)); or shaped arcuately (FIG. 27(*d*)).

In the case of FIG. 27(*b*), the bevelled ends of the rib 141 are deviated one from the other by an offset 6. In this case, the rib ends may be less bevelled or not processed for bevelling. In FIGS. 27(*a*) to 27(*d*), the direction of the belt travelling is indicated by a direction R with an arrow head, and the sliding surface of the rib guide 17 is denoted as Sf. The offset alignment of the rib ends successfully prevents the sliding members (to the sliding surface Sf) from being caught by the ends of the rib 141.

Since the butting portion BUTT of the rib 141 is thus formed, there is no chance that the ends of the ribs 141 are caught by the edges of the rolls, e.g., drive roll 11, and the rib guides 17, and run on another. In other words, the rib guides 17 can smoothly pass the butting portion BUTT.

Figure 28:
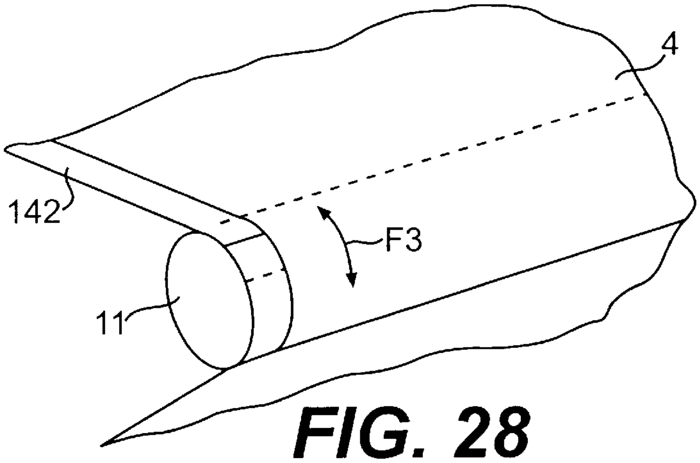
FIG. 28 is a perspective view showing the intermediate transfer belt.

As already stated, the lapping portion LAP of the tape 142 is forwardly located relative to the sliding members in the direction of the travelling of the intermediate transfer belt 4. Although the lapping portion LAP is thus constructed and arranged, there is still a danger that the lapping portion LAP is separated from each other. The reason for this will be described. FIG. 28 is a perspective view showing the intermediate transfer belt.

When passing the drive roll 11, the tape 142 located on the outermost part of the intermediate transfer belt 4 receives a large tension force F3 whose directions are coincident with the circumferential directions of the drive roll 11. The tension force F3 acts to break the bonding in the lapping portion LAP of the tape 142. Also when passing the rolls, e.g., the idle roll 12 and the tension roll 14, the lapping portion LAP repeatedly receives the tension force F3. There is a danger that the bonding in this portion may be broken through its repetitive reception of the tension force F3.

Figure 29A:
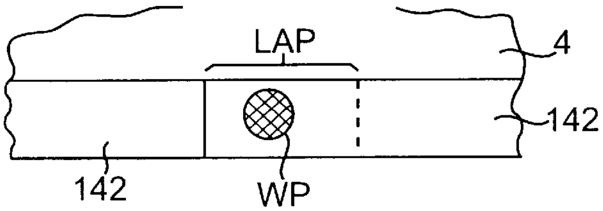
FIGS. 29(*a*) and 29(*b*) are diagrams showing a joining state in the overlapping portion of a belt reinforcing tape.
Figure 29B:
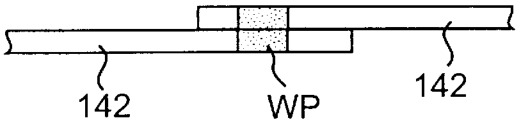

Thus, the present embodiment employs the bonding or welding process for joining together the ends of the tape in the lapping portion. FIGS. 29(*a*) and 29(*b*) are enlarged plan and side views showing a lapping portion LAP where welding process is used for joining together the tape ends. In the figures, a region WP in the lapping portion LAP of the tape 142 is welded and solidified to form a joining portion. A plurality of joining portions may be formed while one joining portion is formed in the illustrated instance. An ultrasonic welding method is preferable for the welding. For the ultrasonic welding method, the technique disclosed in Japanese Patent Unexamined Publication No. Hei. 7-266422 may be used. In this case, the spot welding technique is available.

Figure 30A:
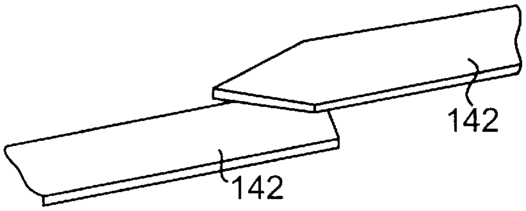
FIGS. 30(*a*) and 30(*b*) are diagrams showing two different overlapping portions of the reinforcing tape.
Figure 30B:
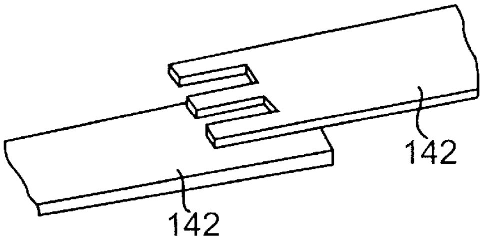

To avoid the bonding breakage by the tension force F3, the following means may be used in place of the welding. The tension force F3 more intensively acts to break the bonding of the tape ends as the rigidity of the tape 142 becomes larger. To reduce the rigidity of the tape 142, means as illustrated in FIG. 30(*a*) or 30(*b*) may be used. The means is to reduce the cross sectional area of the tape end (upper end) to be placed above the other tape end in the lapping portion LAP when viewed in the widthwise direction. In the means of FIG. 30(*a*), the upper tape end is shaped like a wedge when viewed from above or below, and in the means of FIG. 30(*b*), it is shaped like a comb. Thus, the upper end of the tape 142 in the lapping portion LAP is reduced in its horizontal sectional area. With the area reduction, the tape is easy to expand when it receives the tension force F3. As a result, the bonding breakage in the lapping portion LAP hardly occurs.

While in the above-mentioned embodiment, the invention is applied to the intermediate transfer belt as the endless belt, the invention may be applied to an image forming apparatus of the type in which a photosensitive belt is used in place of the photosensitive drum 1.

As described above, the belt reinforcing tapes provided on the outer surface of the endless belt allow the sliding members sliding on the tape to smoothly pass the lapping portions of the tape. Therefore, the bonding in the lapping portion of the belt reinforcing tape is hard to be broken even when it receives a dynamic load from a sliding member, and the belt reinforcing tape fully exercises its function to protect the side ends of the endless belt.

<Third Embodiment>

Figure 33:
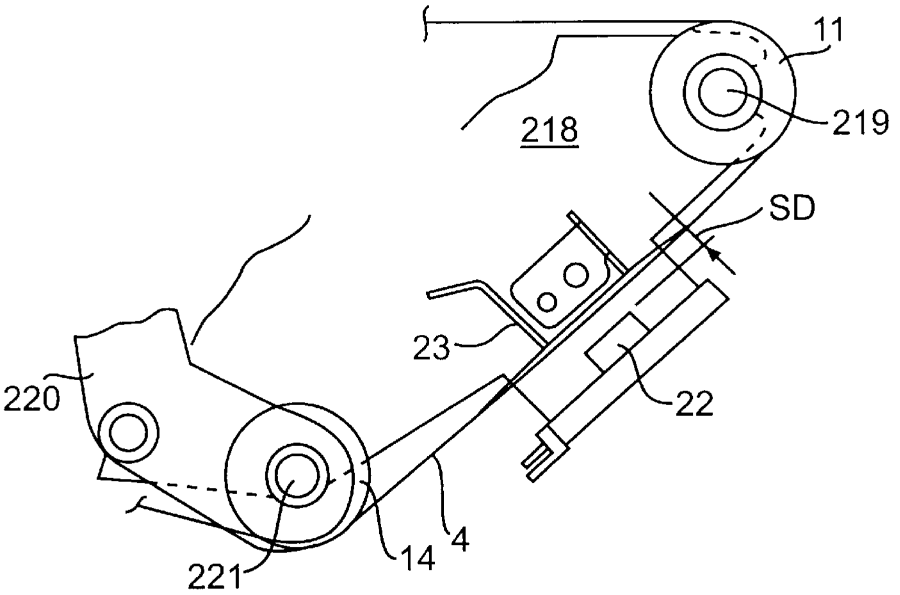
FIG. 33 is an enlarged view showing an intermediate transfer belt in a third embodiment of the present invention.

A third embodiment of the present invention will be described. FIG. 33 is an enlarged view showing how to mount a reflection type sensor for sensing a reference position on the intermediate transfer belt 4. In the figure, the drive roll 11 is supported by a side frame 218 which forms a belt unit through a shaft 219. The tension roll 14 is supported by a bracket 220, which is supported on the side frame 218 in a swingable manner, through a shaft 221. The intermediate transfer belt 4 passes around various rolls; the drive roll 11, tension roll 14, idle roll 12 and secondary-image-transfer back-up roll 13. The tension roll 14 tightens the intermediate transfer belt 4 passing those rolls.

Figure 46:
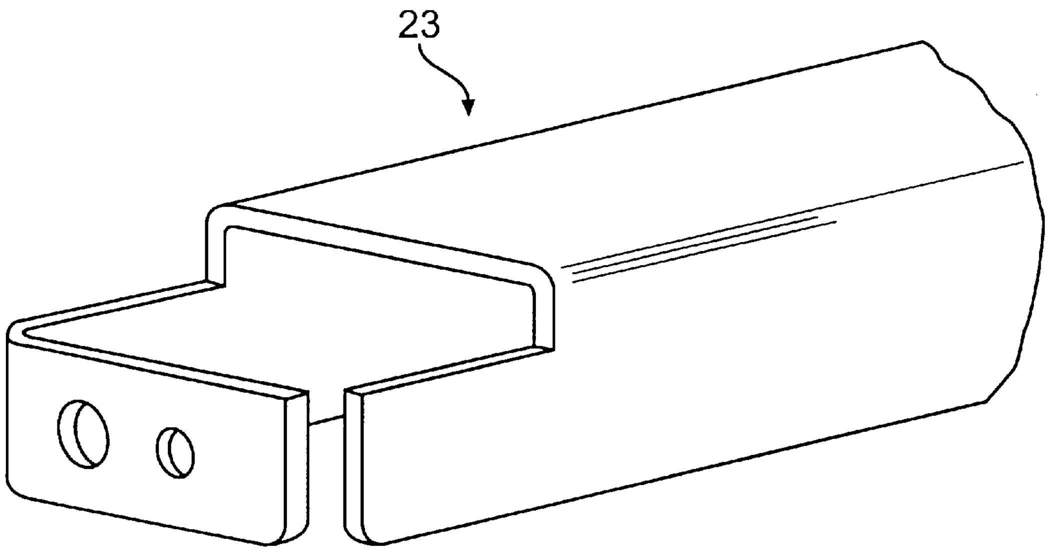
FIG. 46 is a perspective view showing a part of a backing member.
Figure 47:
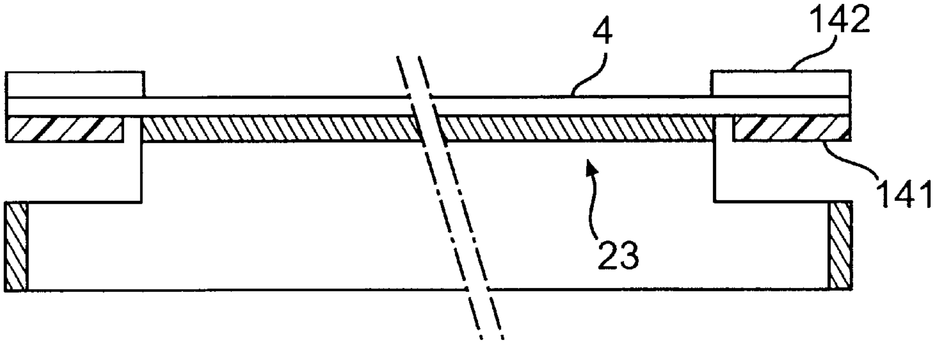
FIG. 47 is a cross sectional view showing the backing member.

A reflection type sensor 22 for sensing a reference position on the intermediate transfer belt 4 is disposed between the drive roll 11 and the tension roll 14. The reflection type sensor 22 is directly mounted on the side frame 218 so that the distance SD between the sensor and the intermediate transfer belt 4 is invariable. A backing member 23 is disposed at a location facing the reflection type sensor 22 on the back side, or the inner circumferential surface, of the intermediate transfer belt 4. As best illustrated in FIGS. 46 and 47, the backing member 23 is shaped like a box. A part of each end of the backing member 23 is partly cut away so as to receive the rib 141 (to be described in detail later).

The backing member 23 is positioned such that it reliably comes in contact with the back side of the intermediate transfer belt 4 at a position deviated slightly to the outer peripheral surface of the intermediate transfer belt 4 from a plane connecting the outer peripheral surface of the drive roll 11 and that of the tension roll 14, and in this state it is mounted on the side frame 218. Thus, the reflection type sensor 22 for sensing a marking to be described later is installed in a state that the distance from it to the intermediate transfer belt 4 is hard to vary.

For example, sensing errors of the reflection type sensor 22 that spread in the advancing direction of the intermediate transfer belt 4 are as tabulated in FIG. 36. As shown in FIG. 36, errors for measurement repetition, power voltage variation and sensing distance determine a total error of sensing. The error that is caused by the distance (sensing distance) between an object to be sensed, or a marking, and the reflection type sensor 22 is 3.8 to 11.6 μm when the vibration of the intermediate transfer belt 4 is 32 μm. These figures of the error are large and this fact indicates that influence of the vibration of the intermediate transfer belt 4 on the total error is great.

Figures 44, 45:
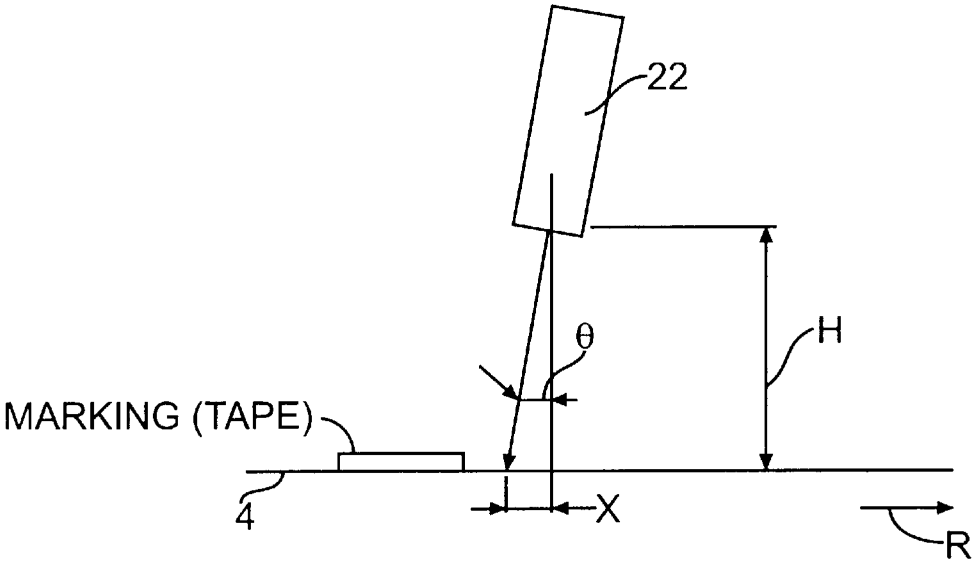
FIG. 44 is a diagram useful in explaining a sensing error by the reflection type sensor which depends on a mounting accuracy of the sensor.
FIG. 45 is a table showing the characteristics of the reflection tape.

The sensing error arising from an error of the mounting angle of the reflection type sensor 22 will be described below. In FIG. 44, H indicates the distance between the tip of the reflection type sensor 22 and the surface of the intermediate transfer belt 4, and θ indicates the angle between the optical axis and the line vertical to the surface of the intermediate transfer belt 4. A sensing error x produced when the intermediate transfer belt 4 vibrates up and down at magnitude of h mm can be mathematically obtained:

$$\text{Rearranging } X/H=x/h \text{ for } x\text{, then we have } x=h\cdot X/H \text{ and } x \text{ (sensing error)}=h\cdot\tan\theta \quad (1)$$

In an example where θ=5° and the intermediate transfer belt 4 vibrates at 0.032 mm, the solution of the equation (1) is 2.8μm, viz., the sensing error x is 2.8 μm.

The sensing error of the marking caused by the mounting error of the reflection type sensor 22 and the vibration of the intermediate transfer belt 4 straightforwardly appears as a color misregistration. It is essential to reduce this error. In this connection, in the present embodiment, the reflection type sensor 22 is fixed to the side frame 218 supporting the intermediate transfer belt 4 to reduce the sensing error, and use of the backing member 23 suppresses the vibration of the intermediate transfer belt 4.

Figure 34:
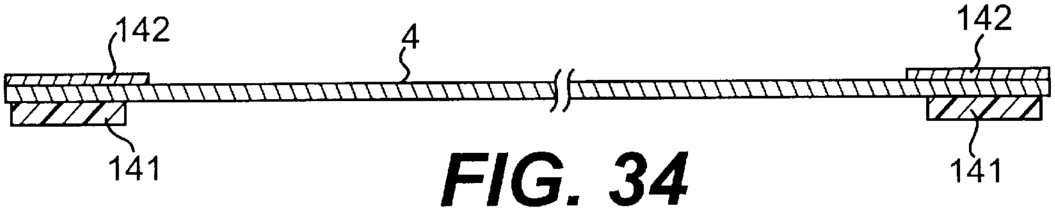
FIG. 34 is a cross sectional view showing the intermediate transfer belt.

Further, to improve the sensing accuracy of the reflection type sensor 22, the embodiment takes a mechanical measure. The measure follows. Reference is made to FIG. 34 showing a cross sectional view of the intermediate transfer belt 4. As shown, the rib 141 is bonded onto and along the side end of the intermediate transfer belt 4. The belt reinforcing tape 142 as belt reinforcing means is bonded onto and along the outside (i.e., the outer surface) of the side end of the intermediate transfer belt 4. The inner side faces of the ribs 141, or their faces located closer to the center of the intermediate transfer belt 4 when viewed in its widthwise direction, come in slidable contact with the end faces of the rolls, e.g., the drive roll 11, when those pass the rolls, to thereby limit the motions of the rolls in the axial direction of the rolls.

The intermediate transfer belt 4 is a semiconductive film which is made of polyimide or its family, and is 50 to 100 μm in thickness, $10^9$ to $10^{12}$Ω.cm in volume resistivity, and $10^{11}$ to $10^{13}$Ω/□ in surface resistivity. The intermediate transfer belt 4 may be made of acrylic resin, vinyl chloride resin or polycarbonate resin containing electric resistance stabilizing agent if it belongs to a semiconductive resin material of which the values of the thickness, volume resistivity, and surface resistivity are within the above mentioned ones.

The material of the rib 141 is preferably thermosetting resin, and the rib 141 maybe a sheet of polyurethane, 0.5 to 1.5 mm thick. The material of the belt reinforcing tape 142 may be polyethylene terephthalate (PET) of 50 to 100 $\mu$m thick.

Figure 35:
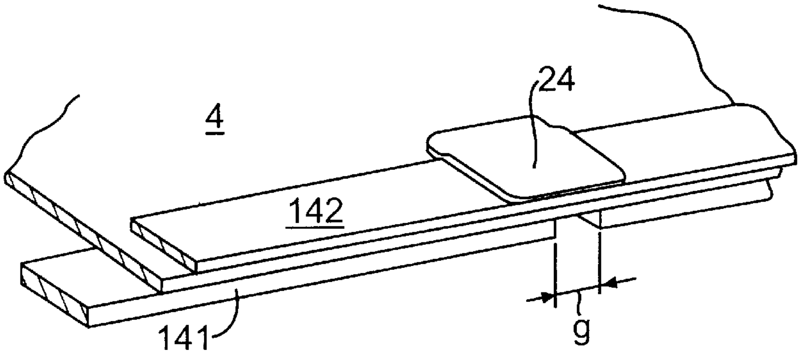
FIG. 35 is a perspective view showing the intermediate transfer belt on which a reflection tape is attached.

FIG. 35 is a perspective view showing the attachment of a reflection tape as a marking to the outer circumferential surface of the intermediate transfer belt 4. The reflection tape 24 is bonded on the belt reinforcing tape 42. In this case, the reflection tape 24 is positioned while being layered across the gap g of the butting portion of the rib 141. The reason why the reflection tape 24 is layered across the gap g of the butting portion will be described.

FIG. 37 is an enlarged view showing a conventional butting portion of the rib for explaining the sensing error. When a gap g is present in the butting portion of the rib 141, the intermediate transfer belt 4 is deformed along the width of the gap g to be curved downward. This curved surface portion serves as a concave lens, and receives light from the reflection type sensor 22 and reflects it. Therefore, there is the possibility that the reflection type sensor 22 senses the reflected light and produces a signal containing information of the reflected light, or a signal containing an error component.

The present embodiment operates in the following manner when the reflection tape 24 is layered across the gap g. FIG. 38 is an enlarged view showing a butting portion of the rib in connection with the reflection type sensor in the third embodiment under discussion. When the intermediate transfer belt 4 moves in the direction of an arrow B, the reflection type sensor 22 senses the leading edge of the reflection tape 24. Therefore, if the reflection tape 24 is curved at the gap A, the reflection type sensor 22 senses light reflected from the curved portion of the tape and produces an erroneous sensing signal immediately after it senses light reflected from the tape surface out of the curved portion of the tape surface and produces a correct sensing signal. In this case, it is relatively easy to technically discriminate between the correct sensing signal and the erroneous sensing signal.

A preferable tape for the reflection tape 24 is good in chemical resistance and heat resistance, and generates less static electricity. An example of such a tape is a polyester tape No. 850, silver color, manufactured by Sumitomo 3M Corporation. This No. 850 tape is constructed such that an aluminum-deposited polyester film is used for the base, and a portion on the film is uniformly coated with acrylic adhesive to form an adhesive portion. The physical characteristics of the No. 850 tape are as shown in FIG. 45. The reflection tape 24 is not limited to the No. 850 tape but may be any other tape if it has the physical characteristics equivalent to the tabulated ones.

<Fourth Embodiment>

Figure 39:
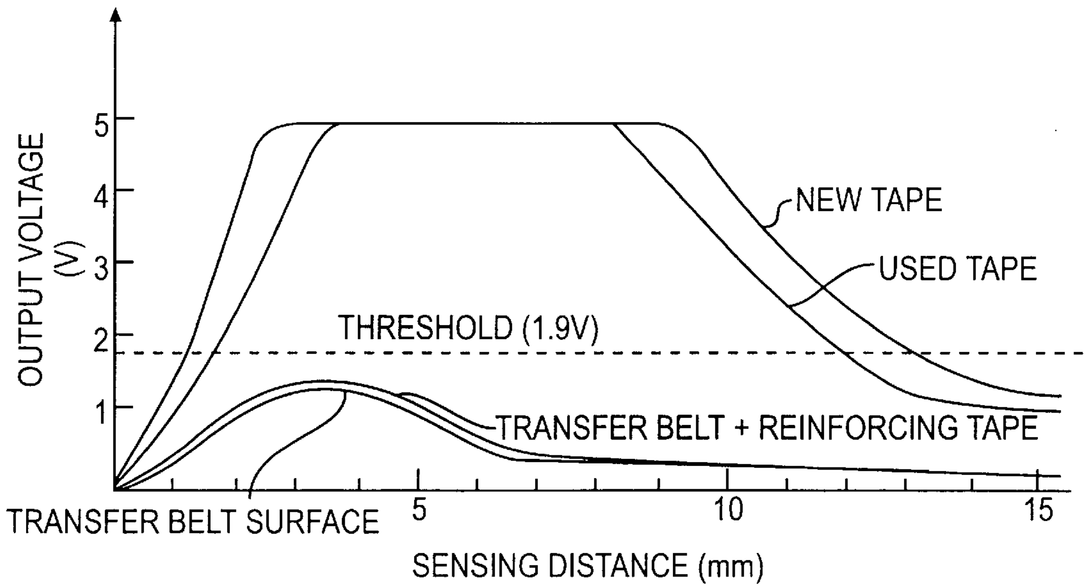
FIG. 39 is a graph showing the output characteristic of the reflection type sensor.

A fourth embodiment of the present invention will be described. FIG. 39 is a graph showing the output characteristic of the reflection type sensor. In the graph, the ordinate represents an output voltage of the reflection type sensor, and the abscissa represents a distance from the sensor to an object to be sensed. In the figure, a threshold voltage is 1.9V. As seen, an output voltage of the reflection type sensor which represents light reflected from the reflection tape 24 is sufficiently high above the threshold voltage level for both used and new reflection tapes. Further, the graph shows that the output voltage of the sensor is sufficient in level in the distance range up to about 10 mm.

The graph also shows that the output voltages of the reflection type sensor when it receives light reflected from the intermediate transfer belt 4 and the belt reinforcing tape 142 bonded onto the intermediate transfer belt 4 are both in level below the threshold voltage, and that the output voltage difference between the intermediate transfer belt 4 and the belt reinforcing tape 142 is small. Two kinds of belt reinforcing tapes 142, a transparent tape and a black tape, were tested for check of the output voltage levels. It was confirmed that little difference was present between the output voltage for the transparent tape and that for the black tape.

Figure 40:
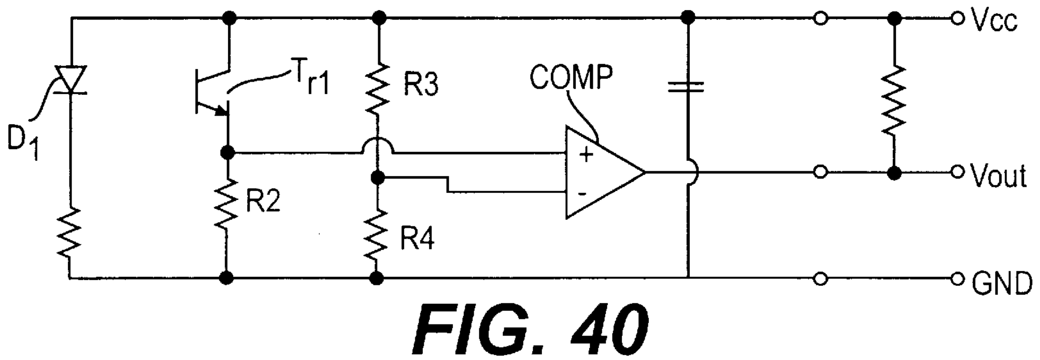
FIG. 40 is a circuit diagram showing the reflection type sensor.

An exemplar circuit expression of the reflection type sensor 22 is shown in FIG. 40. In the circuit, D1 is a light emitting diode; Tr1 is a photo-transistor; and COMP is a comparator. A resistor R2 is inserted between the emitter of the phototransistor Tr1 and the ground. A node between the resistor R2 and the emitter of the photo-transistor Tr1 is connected to the noninverting input terminal of the comparator COMP. A series arrangement of resistors R3 and R4 that is connected between a voltage source Vcc and the ground, forms a voltage divider. A voltage developed across the resistor R4 is applied as a reference voltage to the inverting input terminal of the comparator COMP. In operation, when the voltage Vcc is applied to the light emitting diode D1, the diode D1 then emits light to an object OB to be sensed. The photo-transistor Tr1 senses light reflected from the object OB, and in turn a current i flows through the photo-transistor Tr1 and the resistor R2. A voltage appears across the resistor R2, and is applied to the noninverting input terminal of the comparator COMP. The comparator COMP compares the voltage receiving at the noninverting input terminal with the reference voltage receiving at the inverting input terminal, and outputs the result of comparison as an output voltage Vout.

Judging from the examination of the sensor output characteristic already referred to, it seems that it is easy to discriminate between the reflection tape 24 and another tape or the like. However, there is the possibility of the sensing error occurring in the following cases.

In the case of insufficient bonding of the belt reinforcing tape 142 to the intermediate transfer belt 4, a gap (containing bubbles) is sometimes formed between the belt reinforcing tape 142 and the intermediate transfer belt 4 when it is repetitively used. In particular when the intermediate transfer belt 4 with the belt reinforcing tape 142 adhering thereto passes a roll, such as the drive roll 11, having a large contact angle (lap angle) between the roll and the intermediate transfer belt 4, the intermediate transfer belt 4 and the belt reinforcing tape 142 are greatly deformed and a great stress is put on the bonding portion. Also in the lapping portion of the ends of the belt reinforcing tape 142, a gap is sometimes formed between the lapping portion and the intermediate transfer belt 4.

Figure 41A:
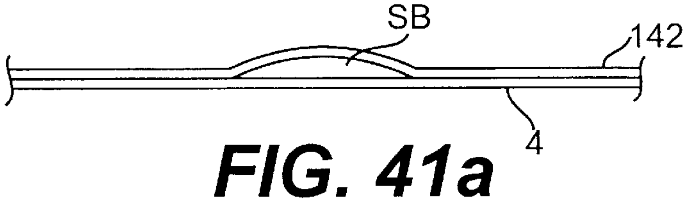
FIGS. 41(*a*) and 41(*b*) are views showing gaps each formed between the belt reinforcing tape and the intermediate transfer belt.
Figure 41B:
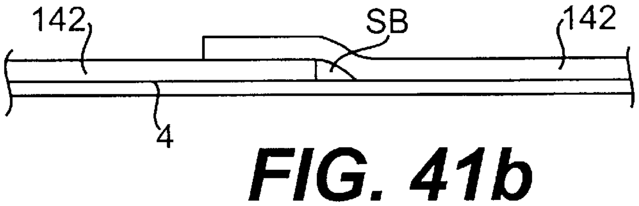

FIG. 41(*a*) is a diagram showing a gap SB formed between the belt reinforcing tape 142 and the intermediate transfer belt 4 when the bonding of them is insufficient, and FIG. 41(*b*) is a diagram showing a gap SB formed in the overlapping portion of the belt reinforcing tape 142.

In a case where the transparent tape is used for the belt reinforcing tape 142, if a gap containing bubbles is formed between it and the intermediate transfer belt 4, the bubble-contained gap blocks the transmission of light of the color of the intermediate transfer belt 4, and it appears white. In this case, light is reflected at the white portion and hits again the reflection type sensor 22, and the output voltage output from the sensor sometimes exceeds the threshold voltage level. Thus, the sensor erroneously produces a sensing signal representative of presence of the reflection tape 24 in a location where the reflection tape 24 is absent.

Figure 42:
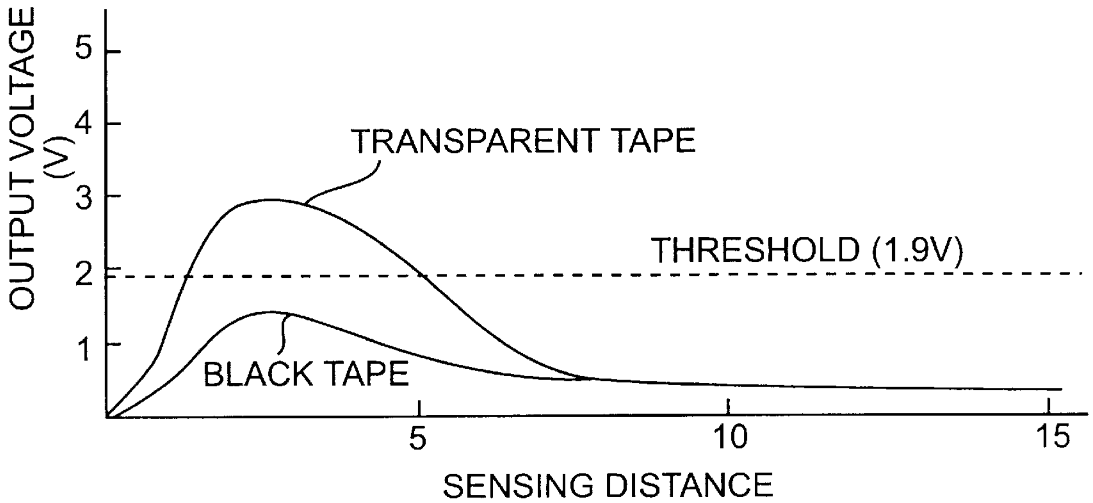
FIG. 42 is a graph showing the output characteristic of a reflection type sensor used in a fourth embodiment of the present invention.

The present embodiment succeeds in preventing the occurrence of the above error by using a black tape for the belt reinforcing tape 142. FIG. 42 is a graph showing the result of measuring the output voltage of the reflection type sensor 22 in a state that a gap containing bubbles is formed between the belt reinforcing tape 142 and the intermediate transfer belt 4. As seen from the measurement result, in the case of using a transparent belt reinforcing tape 142, the output voltage of the reflection type sensor 22 exceeds the threshold voltage, while in the case of using a black belt reinforcing tape 142, the output voltage of the reflection type sensor 22 is below the threshold voltage level even at the gap portion.

<Fifth Embodiment>

A fifth embodiment of the present invention will be described. As seen from FIG. 39 showing the output characteristic of the reflection type sensor 22, if the distance between the reflection type sensor and the reflection tape 24 is approximately 12 mm, the reflection type sensor 22 is capable of producing an output voltage in excess of the threshold level irrespective of whether or not the reflection type sensor 22 is a new or used one.

There is a case where the reflection tape 24 suffers from heavy dirt and/or damage. In this respect, it is very useful that the dirt and/or damage is lessened as much as possible and the mounting position of the reflection type sensor 22 is flexible in its selection.

Figure 43:
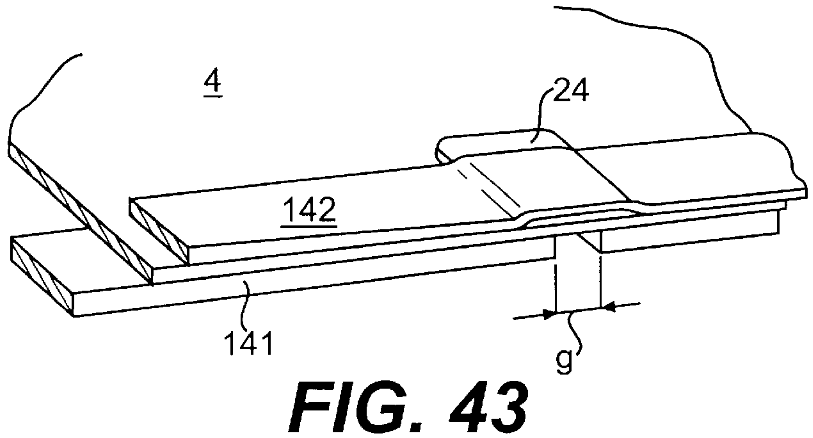
FIG. 43 is a perspective view showing a fifth embodiment of the present invention in which the reflection tape is disposed between an intermediate transfer belt and a belt reinforcing tape.

To realize the dirt and/or damage reduction and the flexible selection of the mounting position, the reflection tape 24 is disposed as shown in FIG. 43. As shown, the reflection tape 24 is interposed between the belt reinforcing tape 142 and the intermediate transfer belt 4. With the interposition of the reflection tape 24, the reflection tape can be protected from dirt and/or damage. Each side seal for sealing the side of the cleaner blade of the cleaner 10 moves while sliding on the ends of the intermediate transfer belt 4. There is no fear that the reflection tape 24 is peeled off by such a sliding member.

While in the above embodiments, the invention is applied to the intermediate transfer belt as the endless belt, the invention may be applied to an image forming apparatus of the type in which a photosensitive belt is used in place of the photosensitive drum 1.

As seen from the foregoing description, in the present invention, the endless belt is supported on frame means, and optical detecting means is fixed to the frame means. Therefore, a fixed positional relationship between the optical detecting means and the endless belt can be maintained. As a result, a reference position on the endless belt can exactly be detected and the color misregistration can be minimized.

What is claimed is:

1. An image forming apparatus having an endless belt as a toner image carrier for holding a toner image thereon and transporting the same, and belt supporting means including a plurality of rolls for supporting the endless belt, said image forming apparatus comprising:

rib members provided on and along both side ends of an inner surface of the endless belt;

rib guide members, provided on both ends of a drive roll of the belt supporting means, for guiding said rib members; and a friction-reduced portion for reducing friction between the endless belt and the drive roll such that the friction at the ends of the drive roll when viewed in an axial direction thereof is smaller than that in a central portion of the drive roll.

2. The image forming apparatus according to claim 1, wherein said friction-reduced portion includes means for forming a gap created between the drive roll and the inner surface of the endless belt.

3. The image forming apparatus according to claim 2, wherein said friction reduced portion is constructed such that each of said rib guide members is shaped like a disk, and an outside diameter thereof is larger than that of the drive roll.

4. The image forming apparatus according to claim 2, wherein said friction-reduced portion is constructed such that an outside diameter of each of both ends of the drive roll is larger than that of the central portion of the drive roll.

5. The image forming apparatus according to claim 1, wherein said friction-reduced portion is constructed such that only the central portion of the surface of said drive roll, except both ends of the surface of the drive roll, is subjected to high friction process, whereby friction at both ends of the surface of the drive roll is smaller than that in the central portion thereof.

6. The image forming apparatus according to claim 5, wherein the high friction process is to coat the surface of the drive roll with polyurethane resin.

7. The image forming apparatus according to claim 1, wherein said friction-reduced portion includes lubricant fine particles coated over the surface of the drive roll, said lubricant fine particles being still left on the surface of said drive roll after a particle wiping-off step following a particle coating step.

8. The image forming apparatus according to claim 7, wherein the lubricant fine particles include image forming material used for forming an image in said image forming apparatus.

9. The image forming apparatus according to claim 1, wherein said rib guide members are made of low friction material.

10. An image forming apparatus having an endless belt as a toner image carrier for holding a toner image thereon and transporting the same, and belt supporting means including a plurality of rolls for supporting the endless belt, said image forming apparatus comprising:

belt reinforcing tapes provided on and along both side ends on an outer surface of the endless belt and including a lapping portion where both ends of each of said belt reinforcing tapes overlap each other, wherein the front end face of said lapping portion faces the direction of travel of said endless belt.

11. The image forming apparatus according to claim 10, further comprising rib members provided on and along both ends of an inner surface of the endless belt and including a butting portion located at ends of each of said rib members, a predetermined distance being provided between the lapping portion and the butting portion in the direction of travel of the endless belt.

12. The image forming apparatus according to claim 11, wherein the distance between the lapping portion and the butting portion is set to be equal to or longer than a circumference length of the roll having the largest lap angle.

13. The image forming apparatus according to claim 12, wherein the ends of each of said rib members forming the butting portion are configured so as not to be caught by end faces of sliding members slidably moving on said rib members.

14. The image forming apparatus according to claim 10, wherein the ends of each of said belt reinforcing tapes forming the lapping portion are joined by welding.

15. The image forming apparatus according to claim 10, wherein of the ends of each of said belt reinforcing tapes forming the lapping portion, the upper end that is placed on the lower end is reduced in its cross sectional area when viewed in the widthwise direction of said belt reinforcing tape.

16. The image forming apparatus according to claim 11, wherein each of said belt reinforcing tapes is wider than each of said rib members, and an end face of the inner side of each of said belt reinforcing tapes is protruded, beyond an end face of the inner side of each of said rib members, toward a central portion of the endless belt when viewed in its widthwise direction.

17. The image forming apparatus according to claim 16, wherein an amount of protrusion of the end face of the inner side of each of said belt reinforcing tapes beyond the end face of the inner side of each of said rib members, is selected such that when the endless belt maximumly walks toward the other rib member on the roll supporting the endless belt, each of said belt reinforcing tapes includes a portion where said tape overlaps with the roll.

18. The image forming apparatus according to claim 16, wherein the roll includes at both ends thereof rib guides slidably contacting with the inner side surfaces of said rib members, and the amount of protrusion of the end face of the inner side of each of said belt reinforcing tapes beyond the end face of the inner side of each of said rib members, is selected such that when the endless belt maximumly walks toward the other rib member on the roll supporting the endless belt, each of said belt reinforcing tapes includes a portion where said tape overlaps with the circumferential surface of said rib guide.

19. The image forming apparatus according to claim 10, further comprising a belt cleaner with a cleaner blade for cleaning the surface of the endless belt with the cleaner blade brought into contact with the outer circumferential surface of the endless belt, and wherein a distance between said belt reinforcing tapes is set to be longer than a length of the cleaner blade.

20. An image forming apparatus having an endless belt as a toner image carrier for holding a toner image thereon and transporting the same, and belt supporting means including a plurality of rolls for supporting the endless belt, said image forming apparatus comprising:

frame means for supporting a belt device including the endless belt;

a belt-position indicating mark member provided on an outer surface of the endless belt; and optical detecting means for detecting said mark member, said optical detecting means being disposed above the endless belt while being fixed to said frame means.

21. The image forming apparatus according to claim 20, further comprising belt reinforcing tapes provided on and along both side ends on the outer surface of the endless belt, and wherein said belt-position indicating mark member is provided on each of said belt reinforcing tapes.

22. The image forming apparatus according to claim 21, wherein a color of said belt reinforcing tapes is black or a shade of black.

23. The image forming apparatus according to claim 21, wherein a color of said belt reinforcing tapes is the same as of the endless belt or a shade of black.

24. The image forming apparatus according to claim 21, wherein said belt reinforcing tapes are transparent, and said belt-position indicating mark member is disposed between the endless belt and each of said belt reinforcing tapes.

25. The image forming apparatus according to claim 20, further comprising a backing member brought into contact with a back face of the endless belt and disposed in a region extending in a widthwise direction of the endless belt and containing at least a position located in opposition to said optical detecting means.

26. The image forming apparatus according to claim 25, wherein said backing member is fixed to said frame means to which said optical detecting means is fixed.

27. An image forming apparatus having an endless belt as a toner image carrier for holding a toner image thereon and transporting the same, and belt supporting means including a plurality of rolls for supporting the endless belt, said image forming apparatus comprising:

rib members provided on and along both side ends of an inner surface of the endles belt and including butting portions each at ends of each of said rib members;

a belt-position indicating mark member provided on an outer surface of the endless belt while being laid over the butting portion of each of said rib members; and optical detecting means for detecting said mark member, said optical detecting means being disposed above the endless belt.

28. The image forming apparatus according to claim 27, further comprising belt reinforcing tapes provided on and along both side ends on the outer surface of the endless belt, and wherein said belt-position indicating mark member is provided on each of said belt reinforcing tapes.

29. The image forming apparatus according to claim 28, wherein a color of said belt reinforcing tapes is black or a shade of black.

30. The image forming apparatus according to claim 28, wherein a color of said belt reinforcing tapes is the same as of the endless belt or a shade of black.

31. The image forming apparatus according to claim 28, wherein said belt reinforcing tapes are transparent, and said belt-position indicating mark member is disposed between the endless belt and each of said belt reinforcing tapes.

32. The image forming apparatus according to claim 31, further comprising a backing member brought into contact with a back face of the endless belt and disposed in a region extending in a widthwise direction of the endless belt and containing at least a position located in opposition to said optical detecting means.

33. The image forming apparatus according to claim 32, wherein said backing member is configured so as to avoid said backing member from coming in contact with said rib members provided on and along both side ends of the inner surface of the endless belt.

* * * * *